(12) United States Patent
Nava et al.

(10) Patent No.: US 6,196,411 B1
(45) Date of Patent: Mar. 6, 2001

(54) COMBINED MERCHANDISE CONTAINER AND DISPLAY DEVICE

(75) Inventors: John Nava, Ojai; John Lyons, Long Beach; Donald Farnsworth, Oakland, all of CA (US)

(73) Assignee: East End, Inc., Oakland, CA (US)

( * ) Notice: Subject to any disclaimer, the term of this patent is extended or adjusted under 35 U.S.C. 154(b) by 0 days.

(21) Appl. No.: 09/333,533

(22) Filed: Jun. 15, 1999

Related U.S. Application Data

(63) Continuation-in-part of application No. 09/160,664, filed on Sep. 25, 1998, now Pat. No. 6,070,752.

(51) Int. Cl.[7] .................................................... A47G 19/22
(52) U.S. Cl. ....................... 220/521; 220/709; 220/23.86; 206/217; 206/307
(58) Field of Search .................................. 220/521, 522, 220/254, 256, 259, 212, 694, 703, 705, 709, 23.86; 215/6, 227, 228, 386–388; 206/216, 217, 307, 308.1, 308.3

(56) References Cited

U.S. PATENT DOCUMENTS

| D. 226,063 | 1/1973 | Warnberg . |
|---|---|---|
| D. 384,580 | 10/1997 | Fernandes et al. . |
| 1,395,594 | 11/1921 | Pfefferle . |
| 1,755,042 | 4/1930 | Zoller . |
| 1,773,972 | 8/1930 | Eberhart . |
| 2,015,028 | 9/1935 | Gillette . |
| 2,050,487 | 8/1936 | Durrant . |
| 2,120,403 | 6/1938 | Godfrey . |
| 2,174,618 | 10/1939 | Burdick . |
| 2,271,589 | 2/1942 | Hendrickson . |
| 2,374,092 | 4/1945 | Glaser . |
| 2,649,984 | 8/1953 | Abt . |
| 2,766,796 | 10/1956 | Tupper . |
| 3,071,281 | 1/1963 | Sawai . |
| 3,245,691 | 4/1966 | Gorman . |
| 3,269,734 | 8/1966 | Ottofy . |
| 3,421,653 | 1/1969 | Whaley . |
| 3,433,378 | 3/1969 | Ross . |
| 3,561,668 | 2/1971 | Bergstrom . |
| 3,624,787 | 11/1971 | Newman . |

(List continued on next page.)

FOREIGN PATENT DOCUMENTS

| 2649080 | 1/1991 | (FR) . |
|---|---|---|
| 2704209 | * 10/1994 | (FR) . |

Primary Examiner—Nathan J. Newhouse
(74) Attorney, Agent, or Firm—Henricks, Slavin & Holmes LLP

(57) ABSTRACT

A variety of closures are provided for use with a drink cup or other container wherein the closures provide a compartment for receiving a digital media disk or other merchandise. Examples include various closures formed of inner and outer members connected by a hinge with the inner and outer members forming a compartment for closely receiving a digital media disk. Other examples include a closure having a single lid portion with a retaining mechanism for retaining a digital media disk to a top surface of the lid. The retaining mechanism includes, for example, elastic retaining bands or resilient tabs. In another example, the closure provides a curved compartment for receiving a booklet wherein a closure for the compartment includes snap-fit members for attaching the compartment closure to other portions of the container lid. Still other embodiments are provided for enclosing toys or the like including one embodiment wherein the closure is configured to retain both a compressible ball and a backboard. In use, after any beverage within the cup is consumed, the backboard is removed from the closure and mounted to a rim of the cup for providing a basketball hoop-like arrangement for use with the compressible ball. Numerous other embodiments are described.

24 Claims, 33 Drawing Sheets

U.S. PATENT DOCUMENTS

| | | |
|---|---|---|
| 3,734,276 | 5/1973 | Bank . |
| 3,745,055 | 7/1973 | Gorman . |
| 3,746,158 | 7/1973 | Connick . |
| 3,768,688 | 10/1973 | Linke . |
| 4,007,936 | 2/1977 | Hornsby, Jr. . |
| 4,018,355 | 4/1977 | Ando . |
| 4,074,827 | 2/1978 | Labe, III . |
| 4,389,802 | 6/1983 | McLaren et al. . |
| 4,971,211 | 11/1990 | Lake . |
| 5,064,082 | 11/1991 | Lombardi et al. . |
| 5,099,232 | 3/1992 | Howes . |
| 5,180,079 | 1/1993 | Jeng . |
| 5,325,982 * | 7/1994 | Cobb, Jr. .................... 220/709 X |
| 5,375,828 | 12/1994 | Shikami . |
| 5,397,023 | 3/1995 | Toczek et al. . |
| 5,489,026 | 2/1996 | D'Aloia . |
| 5,524,788 | 6/1996 | Plester . |
| 5,531,347 | 7/1996 | Goulding . |
| 5,542,532 | 8/1996 | Mitchell . |
| 5,592,766 | 1/1997 | Mygatt . |
| 5,641,063 | 6/1997 | Gambardella et al. . |
| 5,695,084 * | 12/1997 | Chmela et al. ................ 220/212 |
| 5,713,463 | 2/1998 | Lakoski et al. . |
| 5,722,558 | 3/1998 | Thompson . |
| 5,746,312 | 5/1998 | Johnson . |
| 5,769,263 | 6/1998 | Willingham et al. . |
| 5,806,707 | 9/1998 | Boehm et al. . |
| 5,829,583 | 11/1998 | VerWeyst et al. . |
| 5,971,195 * | 10/1999 | Reidinger et al. ............ 220/521 |

* cited by examiner

COMBINED MERCHANDISE CONTAINER AND DISPLAY DEVICE

PRIORITY

This application is a continuation-in-part of U.S. patent application No. 09/160,664, filed Sep. 25, 1998, now U.S. Pat. No. 6,070,752.

BACKGROUND OF THE INVENTION

I. Field of the Invention

The invention generally relates to closures for merchandise containers and in particular to closures for drink cups and the like.

II. Description of the Related Art

Closures for merchandise containers such as soft drink cups are well known. In some cases, it is desirable to provide the closure with a compartment for holding a prize, game token, premium or the like. As such, after purchasing a soft drink or the like, the purchaser then opens the closure to reveal the contents therein, perhaps winning a prize.

Problems however arise with the closures that have been provided with compartments, particularly when the closures are used for drink cups or other containers containing beverages. Typically, the closure is configured with an opening, such as a pair of cris-crossed slits, for receiving a straw. When a straw is inserted through the slits, liquid can seep through the slits and into the compartment thereby damaging the contents therein, perhaps rendering the contents unusable. Indeed, seepage through the slits is virtually inevitable if the portion of the closure in which the slits is formed is disposed near the level of the beverage. In such a case, downward displacement of the closure as a result of the initial insertion of the straw through the slits typically submerges the slits within the beverage causing substantial seepage through the slits. In cases where the closure compartment is at or below the level of the cup lip, the volume of this compartment actually displaces the interior volume of the cup and thus upon attachment of the closure would cause substantial spillage in a fully filled beverage. Moreover, customers at quick service restaurants and the like usually prefer beverages to be filled to the brim. With the beverage filled to the brim, substantial seepage or spillage can occur upon insertion of the straw or attachment of the closure itself causing considerable annoyance to the customer and extra work for the restaurant staff mopping up the spilled beverages. To avoid this problem, beverage cups are often filled only to a specified level well below the brim of the cup. In restaurants where the cup is automatically filled, automatic filling devices therefore need to be properly set and monitored to ensure that the beverage does not exceed the specified level. If the cup is manually filled by the staff, the staff therefore needs to constantly remember to fill the cup only to the specified level. Furthermore, in many quick service restaurants, the customers fill their own beverage cups, thereby permitting re-fills by the customer. The customers are often not aware that filling the cup to the brim will cause subsequent spillage and, hence, the customers typically overfill the cups resulting in frequent and substantial spillage in the vicinity of the beverage dispensers.

Moreover, even if no seepage or spillage through the slits occurs, the closure itself which is typically formed of plastic may have cracks or other deformities which can also result in seepage into the compartment. Such cracks may occur during manufacturing or perhaps as a result of mishandling of the closure prior to mounting the closure to the drink container. If cracks are present within portions of the closure forming the compartment, then liquid may seep through the cracks and into the compartment damaging the contents therein. Seepage through cracks is virtually inevitable if the portion of the closure forming the bottom of the compartment has such cracks and that portion is disposed near or below the level of the liquid. Buckling of the closure as a result of the downward insertion of the straw through the slits may expand or create such cracks.

In general, a substantial risk of seepage or spillage occurs if either the cris-crossed slits of the closure or the compartment itself are positioned such that, when the closure is mounted to the drink container, the slits or the bottom of the compartment are positioned at or below the top perimeter edge of the drink container. Unfortunately, prior art compartment closures for drink containers are typically configured to position both the cris-crossed slits and the bottom of the compartment well below the top perimeter edge of the drink container.

It would be desirable to provide a merchandise container closure, particularly a closure for use with drink containers, with a compartment wherein the closure is configured to avoid the aforementioned problems and it is to that end that the invention of the parent application was primarily directed.

The present application is directed to providing additional embodiments of a merchandise container closure, particularly a closure for use with conventional drink containers of the type employed within quick service restaurants.

SUMMARY OF THE INVENTION

In accordance with a first aspect of the invention, a hinged closure with compartment is provided for a drink container. The closure includes an inner member having an opening formed therein for receiving a straw and having a peripheral portion for snap-on mounting to a drink container. The closure additionally includes an outer member configured to be fitted to the inner member forming a compartment therebetween. The outer member has an opening which is aligned with the opening of the inner member while the outer member is fitted to the inner member. The aligned openings permit penetration of a straw therethrough. The closure additionally includes a hinge pivotally connecting the inner and outer members along peripheral portions thereof. By connecting the inner and outer members with a hinge, the entire closure can be conveniently and inexpensively formed from a single blank which is then folded or bent along the hinge to attach the outer member to the inner member forming the compartment therebetween.

In an exemplary embodiment, the inner and outer members form a completely enclosed compartment shaped to closely receive a disk containing digital media with the openings of the inner and outer members aligned with a center of the compartment to permit a straw penetrating the openings to pass through a center hole within a digital media disk contained therein. In an alternative embodiment, the inner and outer members form an open-sided compartment leaving a portion of the digital media disk exposed.

In accordance with a second aspect of the invention, a closure with a digital media disk retaining mechanism is provided for use with a drink container. The closure includes a lid having an opening formed therein for receiving a straw and having a flat, top circular surface for supporting a digital media disk and a peripheral portion for snap-on mounting to the drink container. A retaining mechanism is provided for retaining the digital media disk against the top circular surface of the lid.

In one embodiment, the retaining mechanism is an upwardly projecting peripheral rim formed on the lid and having a plurality of inwardly extending resilient tabs for engaging outer peripheral portions of the digital media disk. In one example, three of the resilient tabs are provided equally spaced around the periphery of the lid. In another example, a greater plurality of resilient tabs are provided along with a notch to facilitate easy removal of the disk. In yet another embodiment, the retaining mechanism includes an upwardly projecting pedestal formed in the center of the lid having an outwardly extending rim for engaging portions of an inner periphery of the central opening of the digital media disk. A separate retaining disk is provided for mounting around the central pedestal between a top surface of the digital media disk and a bottom edge of the outwardly projecting rim. The retaining disk may include a pull tab or other mechanism for facilitating removal of the retaining disk to permit easy removal of the digital media disk. In still another embodiment, the retaining mechanism includes a pair of diametrically opposed upwardly projecting rim portions formed on a periphery of the lid and a restraining band mounted around the rim portions and over a top surface of the digital media disk. In yet another embodiment, a restraining band is provided in connection with an upwardly projecting pedestal.

By providing a restraining mechanism in combination with a lid for supporting a digital media disk, an outer closure member need not be provided, yet a digital media disk is securely mounted to the drink container lid.

In accordance with a third aspect of the invention, a closure having a snap-on lens is provided for a drink container. The closure includes an inner member having an opening formed therein for receiving a straw and having a peripheral portion for snap-on mounting to the drink container. The closure also includes a lens-shaped compartment closure member configured to be fitted to the inner member forming a curved compartment therebetween for receiving a booklet. The compartment is offset from the opening of the inner member to permit a straw penetrating the openings to pass alongside the compartment. The closure also includes snap-fit connection members for detachably connecting the lens-shaped compartment closure member to the inner member thereby enclosing the compartment and securing any material, such as a booklet, therein.

In accordance with a fourth aspect of the invention, a closure is provided for holding a digital media disk within a compartment or bag hanging from a peripheral portion of a drink container lid. More specifically the closure includes a lid having an opening formed therein for receiving a straw and having a peripheral portion for snap-fit mounting to the drink container. A compartment containing a digital media disk depends from the peripheral portion of the lid and, in use, hangs adjacent to an outer surface of a side wall of the drink cup.

In accordance with a fifth embodiment of the invention, a closure is provided that is configured to hold a toy, such as a ball, and having portions adapted for forming a backboard for use with the toy. The closure includes an inner member having an opening formed therein for receiving a straw and having a peripheral portion for snap-on mounting to a drink container. An outer member is configured to be fitted to the inner member forming a semi-spherical compartment therebetween for enclosing a toy. A flexible, removable backboard member is mounted horizontally between the inner and outer members. The backboard member has a pair of slots for vertically mounting the backboard member to a rim of the drink container following removal of the backboard member from within the compartment.

In accordance with a sixth embodiment of the invention, a closure is provided for mounting to a drink container wherein the closure includes a compartment for enclosing a toy. The closure includes an inner member having a pedestal with an opening formed therein for receiving a straw and having a peripheral portion for snap-on mounting to the drink container. The inner member has a top supporting portion configured for supporting the toy with the pedestal being offset from the toy supporting portion. The closure also includes an outer member configured to be fitted to the inner member forming a compartment for closely receiving the toy. The outer member also has an opening, with the opening of the outer member aligned with the opening of the inner member while the outer member is fitted to the inner member. The aligned openings permit penetration of a straw therethrough. The opening of the outer member is sized to frictionally fit against outer side surfaces of the pedestal of the inner member while the outer member is fitted to the inner member. In this manner, any seepage of beverage through the opening of the straw insertion pedestal will not likely result in seepage into the compartment and hence a toy contained therein remains dry and undamaged.

Other objects features and advantages of the invention are achieved as well.

BRIEF DESCRIPTION OF THE DRAWINGS

The features, objects, and advantages of the invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
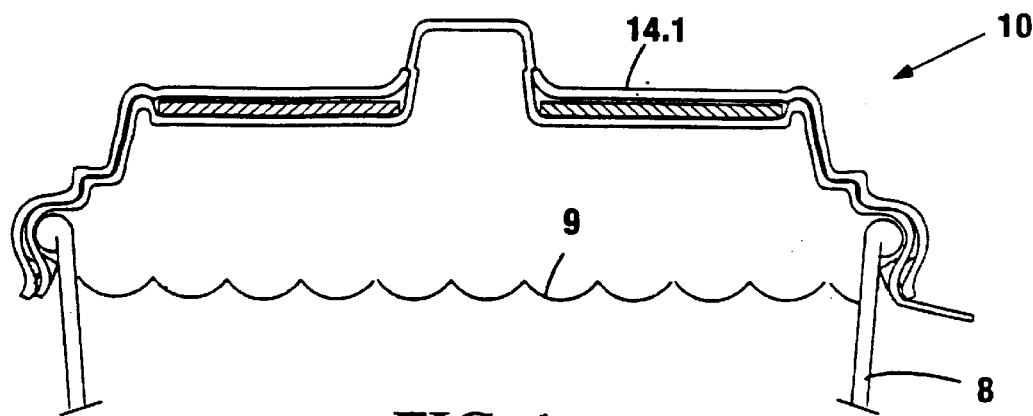
FIG. 1 is an cross-sectional view of a merchandise container closure of a first exemplary embodiment of the invention, taken on a plane which contains the axis of symmetry of the closure.
Figure 2:
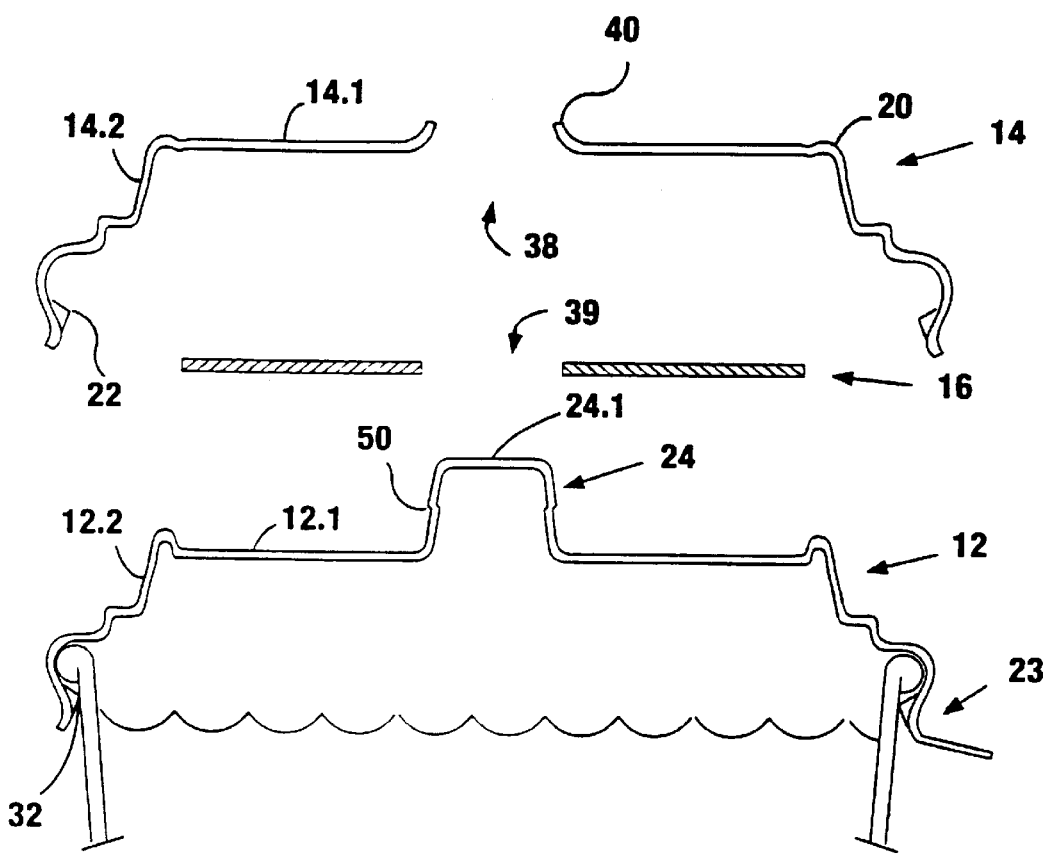
FIG. 2 is an exploded cross-sectional view of the merchandise container closure of FIG. 1, also taken on a plane which contains the axis of symmetry of the closure.

Referring now to FIGS. 1 and 2, a closure 10 of a first exemplary embodiment of the invention is illustrated. Closure 10 is comprised of an inner member 12 and an outer member 14 and, in use, is mounted to a drink cup or other merchandise container 8. In the example of FIG. 2, cup 8 includes a liquid beverage 9. The inner and outer members form a compartment therebetween for receiving a digital media disk 16, such as a CD, CD-ROM, or other contents. Outer member 14 has a central discate portion 14.1 surrounded by a tall, cylindrical sidewall 14.2. Inner member 12 likewise has a central discate portion 12.1 surrounded by a matching tall, cylindrical sidewall 12.2. With the provision of tall sidewalls 12.2 and 14.2, the inner and outer members together generally take the form of an inverted cup configured to position its contents (i.e. media disk 16) sufficiently above the level of beverage 9 to preclude immersion of the contents in the beverage. As noted above, customers usually prefer that a beverage cup be filled to the brim. With the closure of FIGS. 1 and 2, the cup can be filled to the brim without significant risk of seepage or spillage of the beverage upon insertion of a straw (not shown). In this regard, even if the closure is displaced downwardly by a significant amount during insertion of the straw, the bottom of the closure remains above the top level of the beverage thereby preventing seepage or spillage.

As seen in FIG. 1, discate part 14.1 of outer member 14 is depressed slightly with respect to a top edge of sidewall 14.2 forming a perimeter wall 20 which serves to stiffen outer member 14. A trunco-conical flange 12.3 extends outwardly from the lower edge of cylindrical sidewall 12.2 remote from discate part 12.1. Likewise, a trunco-conical flange 14.3 extends outwardly from the lower edge of cylindrical sidewall 14.2 remote from discate part 14.1. A plurality of protrusions 22 project inwardly from the inner face of truncoconical flange 14.3. A large number of protrusions 22 may be provided. A suitable depression 23 is provided in the outer face of the trunco-conical flange 12.3 of inner member 12 for receiving protrusions 22, and thus locking inner member 12 and outer member 14 together in a nesting relationship when inner member 12 is registered with and then pushed onto outer member 14. Inner member 12 and outer member 14 are of such configuration that when locked together in the manner just described, a compartment or cavity is defined between them which is large enough to contain digital media disk 16. A raised portion 24 is formed in the center of inner member 12 which, in use, fits closely within a central opening 38 of outer member 14 and with a central opening 39 of compact disk 16. It follows, then, that raised portion 24 serves to maintain compact disk 16 substantially coaxial with the common axis of symmetry of closure members 12 and 14 when locked together and compact disk 16 is captive between inner member 12 and outer member 14.

Truncoconical flange 14.3 is sufficiently resilient and flexible, and the extent of projection of protrusions 22 into depression 23 is so limited, that outer member 14 can be separated from inner member 12 by pulling outwardly and upwardly on a single point of trunco-conical flange 14.3. A manually graspable pull tab 30 is provided at a point on the outer periphery of trunco-conical flange 14.3 in order to render it easy for the purchaser to apply such a pulling force to outer member 14, and thus to separate it from inner member 12, whereby to gain access to compact disk 16. Although not shown, another pull tab, similar to pull tab 30, may be provided on the periphery of trunco-conical flange 12.3, whereby closure 10 as a whole may readily be removed from the cup or other associated merchandise container when it is desired to remove closure 10 without gaining immediate access to digital disk 16.

Crossed slits 33 are formed on a flat top of raised portion 24 to accommodate a straw (not shown). Thus the slits for receiving a straw are formed on the top of a raised portion 24 which extends upwardly from the central discate portion of inner member 12. The discate portion is itself positioned well above the upper edges of cup 8 upon which closure 10 is mounted by virtue of tall sidewalls 12.2. With this configuration, the slits are positioned substantially above the level of liquid 9 contained in the cup. Thus, it is highly unlikely during normal use of the cup that any liquid from within the cup will pass though crossed slits 33 and into the compartment containing the digital media disk. Indeed, unless the cup is shaken vigorously or perhaps tipped sideways or upside down, no liquid whatsoever from the cup will likely pass through the crossed slits. Hence, the contents are well protected. Depending upon the embodiment, the raised portion extends preferably at least one quarter of an inch above the surrounding discate portion, and in many cases between one half inch and three quarters of an inch or even higher.

Moreover, as noted above, the high sidewalls of inner member 12 position discate portion 12.1 well above the surface of the liquid. Discate portion 12.1 forms the bottom of the compartment containing the digital media disk. Thus, even if cracks are present in discate portion 12.1, perhaps as a result of a manufacturing defect or perhaps as a result of mishandling prior to mounting to the cup, the lowermost part of the compartment is positioned well above the level of the liquid such that it would be unlikely that any liquid would seep through cracks and into the compartment and, hence, the contents of the compartment are still substantially protected from the liquid. Depending upon the embodiment, the sidewall is of sufficient height to position the flat discate portion of the inner member preferably at least one quarter of an inch above the top perimeter edge of the cup, and preferably between one half inch and one and one half inches above the top perimeter edge.

As noted, raised portion 24 extends through an opening 38 of outer member 14. Inner edges 40 of opening 38 are sized to frictionally bear against outer conical side surfaces of the raised portion to secure the inner edge of the outer member to the raised portion thereby helping secure outer member 14 to inner member 12. Moreover, the frictional fit of inner edges 40 to raised portion 24 helps further seal the compartment from seepage of liquid. Hence, even if liquid from the cup passes through crossed slits 33, perhaps because the cup is tipped over, it is still highly unlikely that any liquid would enter the compartment and the contents are thereby further protected. Also, as shown, raised portion 24 may also have a rib 50 formed around its conical sides such that inner edges 40 of the of opening 38 can abut against the rib to further secure the center portions of the outer member to the raised portion of the inner member. For embodiments wherein the rib is present, the outer member need not necessarily be sized to frictionally fit against the side surfaces of the raised member as the engagement of the rib to the inner edges of the outer member may be sufficient to secure the outer member to the raised portion.

Figure 4:
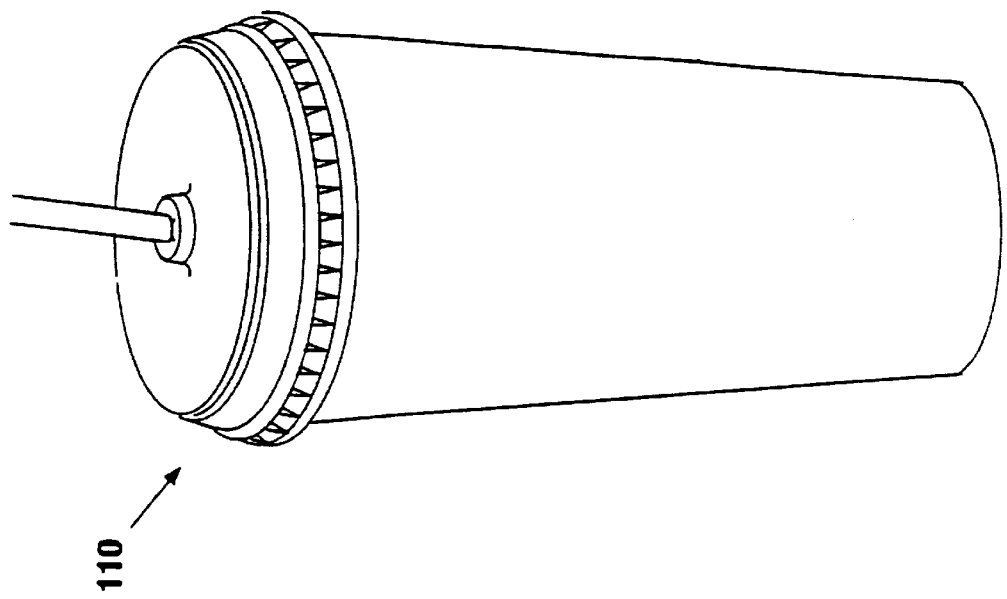
FIG. 4 is perspective view of the merchandise container closure of FIG. 3 shown mounted to a drink cup.
Figure 3:
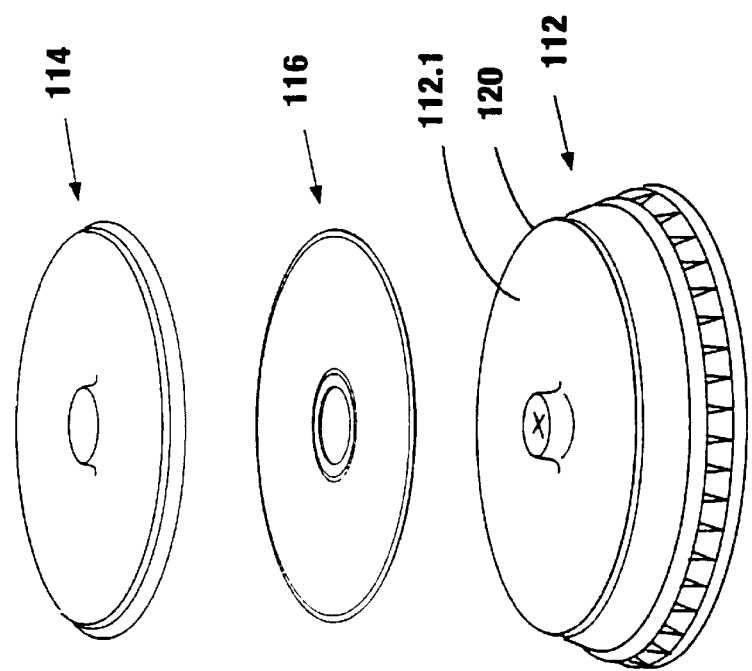
FIG. 3 is perspective view of a merchandise container closure of a second exemplary embodiment of the invention.

Referring now to FIGS. 3 and 4 a second exemplary embodiment of the invention will now be briefly described. The embodiment of FIGS. 3 and 4 is similar to that of FIGS. 1 and 2 and only pertinent differences will be described in detail. Like components are represented with like reference numerals incremented accordingly.

FIGS. 3 and 4 illustrate a closure 110 similar to that of closure 10 of FIGS. 1 and 2 but wherein an outer member 114 extends only to an outer perimeter of a central discate portion 112.1 of an inner member 112. The outer perimeter of outer member 114 is configured to snap onto a top edge of a perimeter wall 120. Suitable snap fit configurations are provided on the outer perimeter of outer member 114 and on perimeter wall 120.

Hence, unlike the embodiment of FIGS. 1 and 2, the outer member does not include sidewalls extending along the sidewalls of the inner member. Nevertheless, contents, such as a digital media disk 116, held between the inner and outer members are well secured and are substantially protected from contamination by any liquid contained within the cup. In this regard, the embodiment of FIGS. 3 and 4 shares many of the same advantages of that of FIGS. 1 and 2 including: the provision of a tall sidewall as part of the inner member; the provision of a raised central portion upon which crossed slits are formed; the provision of a frictionally seal between inner edges of the outer member and side surfaces of the raised portion; and the positioning of a bottom surface of the compartment containing the disk well above the level of any liquid within the cup.

Figure 5:
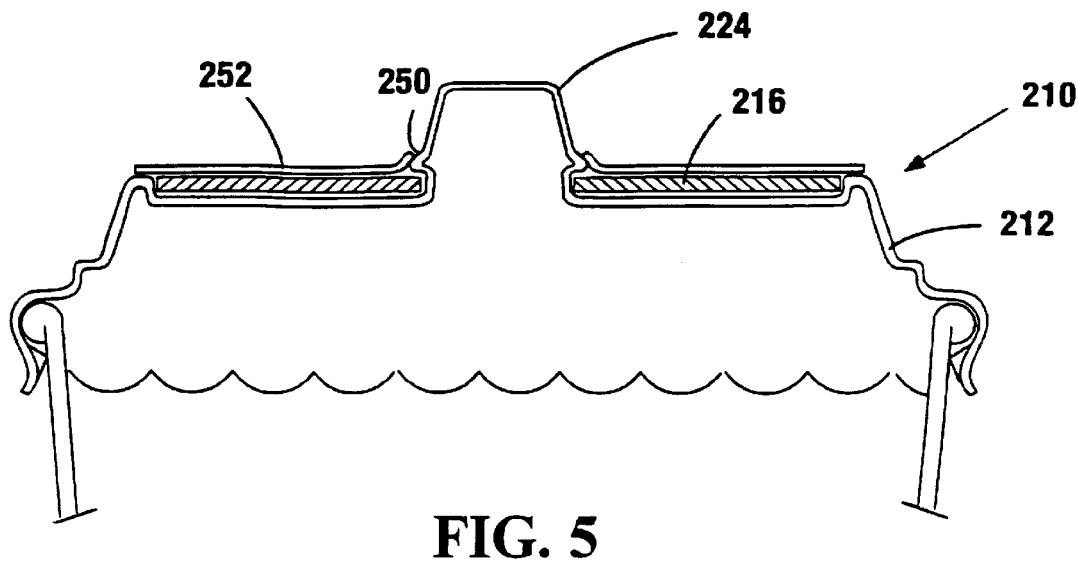
FIG. 5 is an cross-sectional view of a merchandise container closure of a third exemplary embodiment of the invention, taken on a plane which contains the axis of symmetry of the closure.
Figure 6:
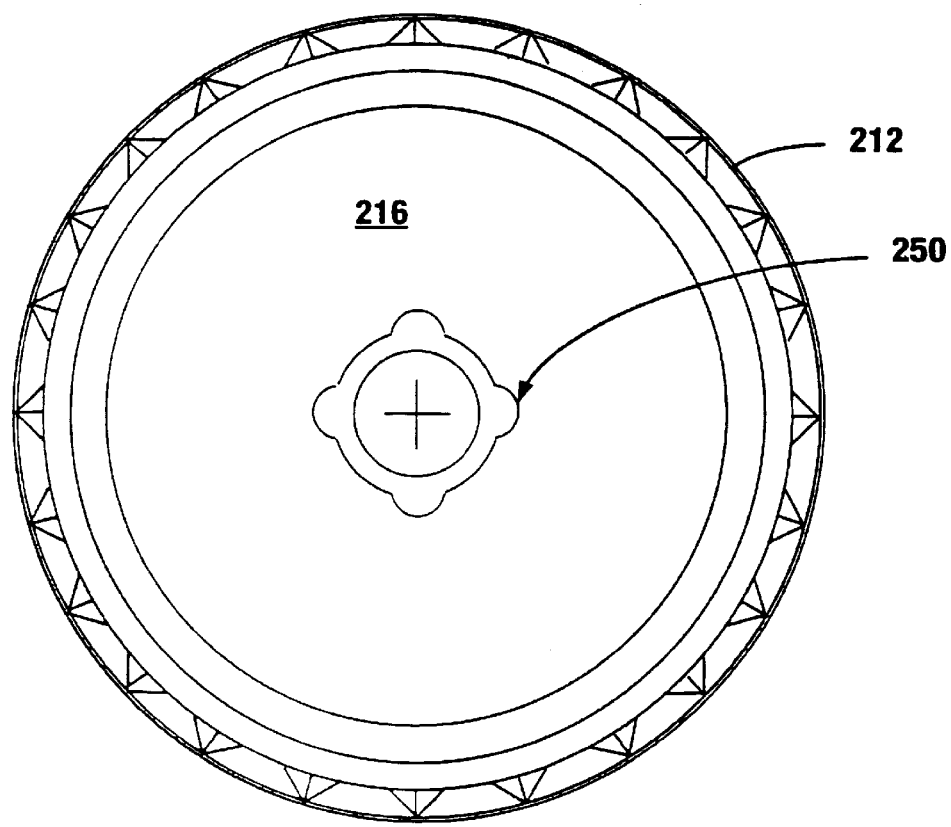
FIG. 6 is an exploded cross-sectional view of the merchandise container closure of FIG. 5, taken on a plane which contains the axis of symmetry of the closure.
Figure 7:
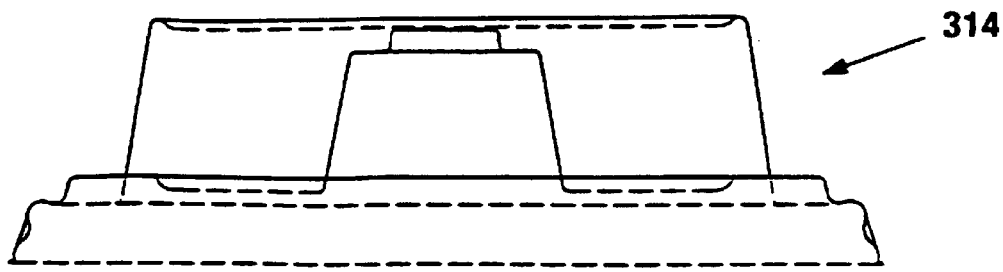
FIG. 7 is an front elevational view of a top part of a merchandise container closure of a fourth exemplary embodiment of the invention.
Figure 8:
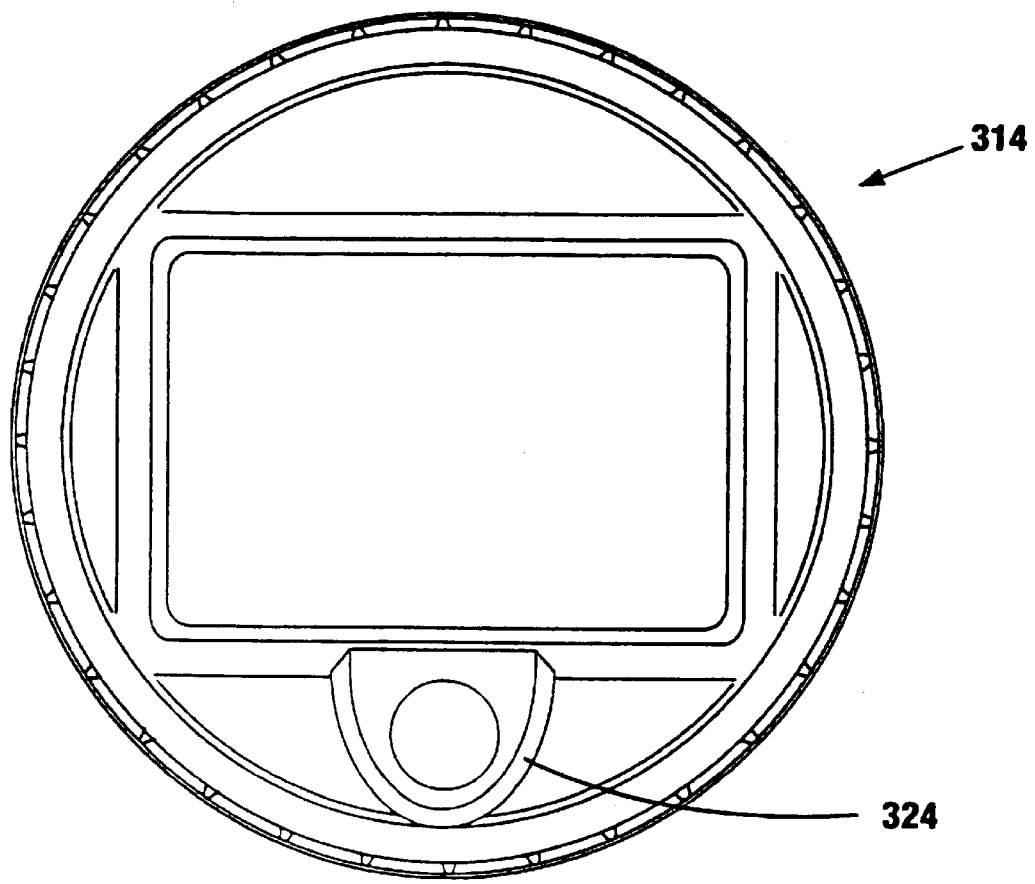
FIG. 8 is a top planar view of the top part of FIG. 7.
Figure 9:
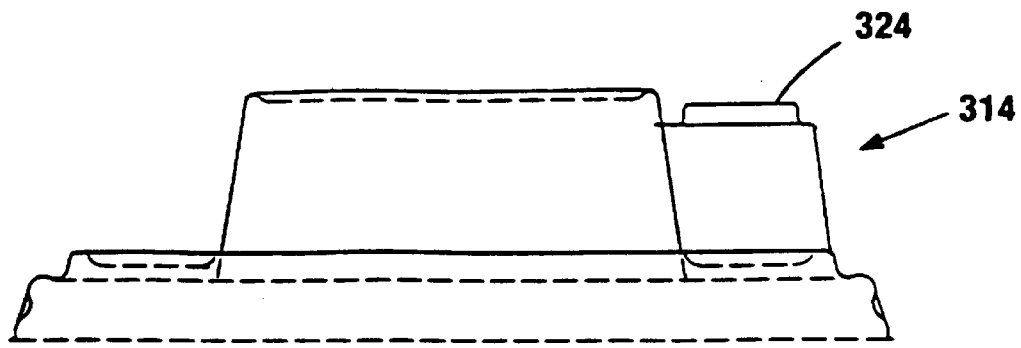
FIG. 9 is a side elevational view of the top part of FIG. 7.
Figure 10:
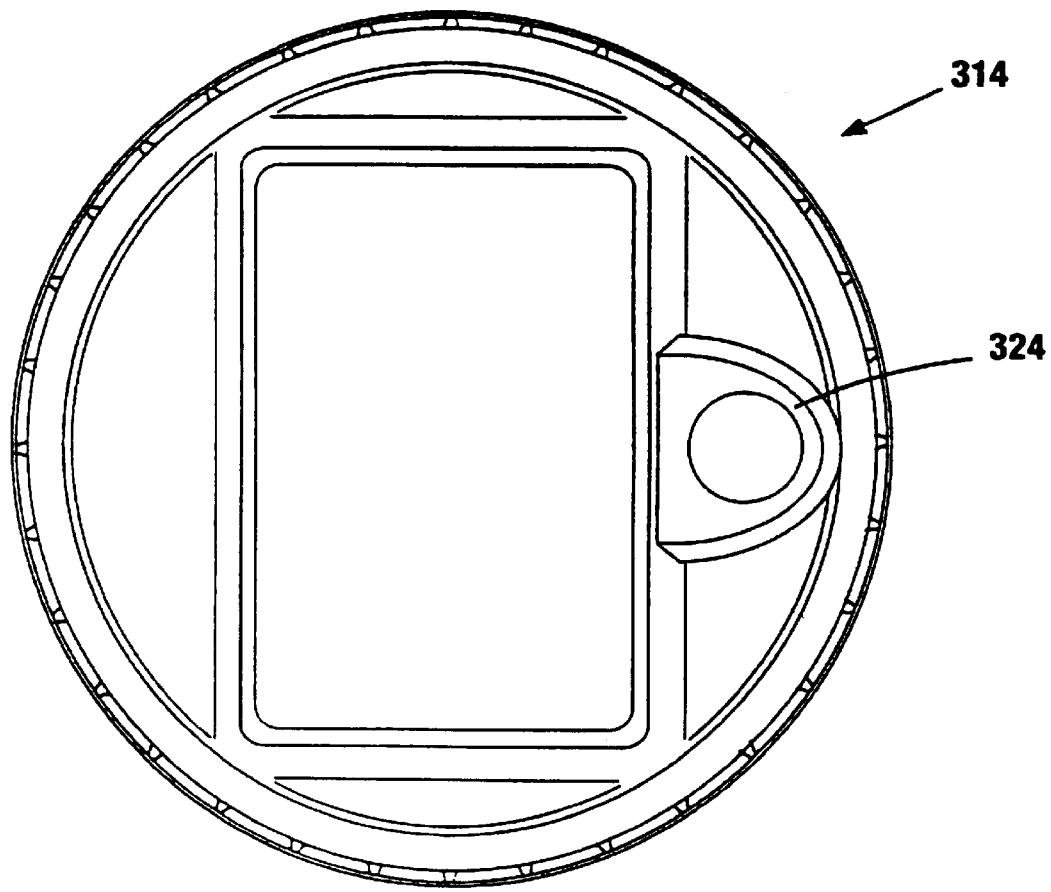
FIG. 10 is another top planar view of the top part of FIG. 7, rotated by 90 degrees.
Figure 11:
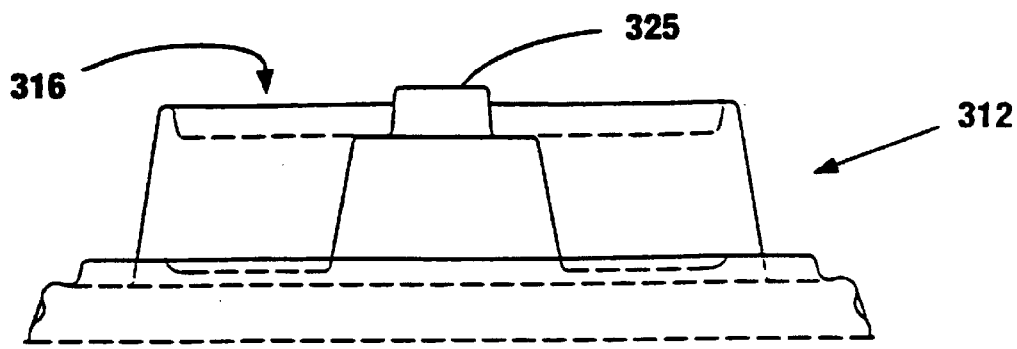
FIG. 11 is a front elevational view of a bottom part of a merchandise container closure of the fourth exemplary embodiment of the invention.
Figure 12:
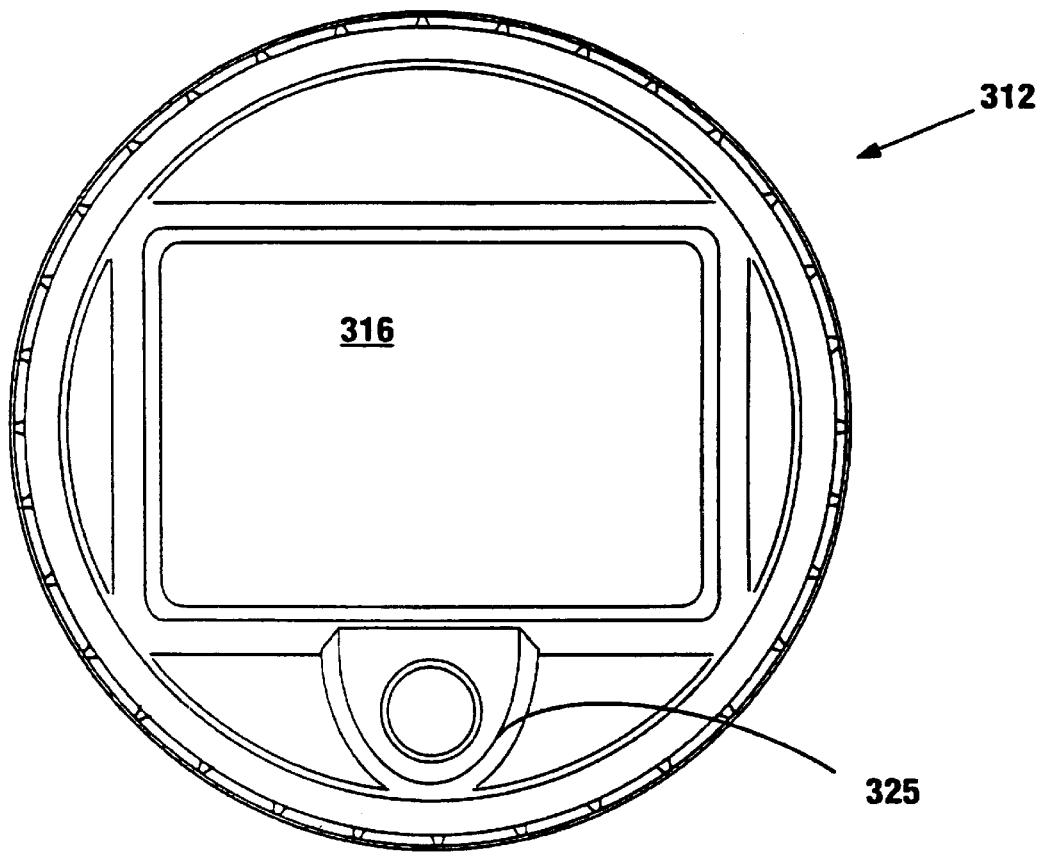
FIG. 12 is a top planar view of the bottom part of FIG. 11.
Figure 13:
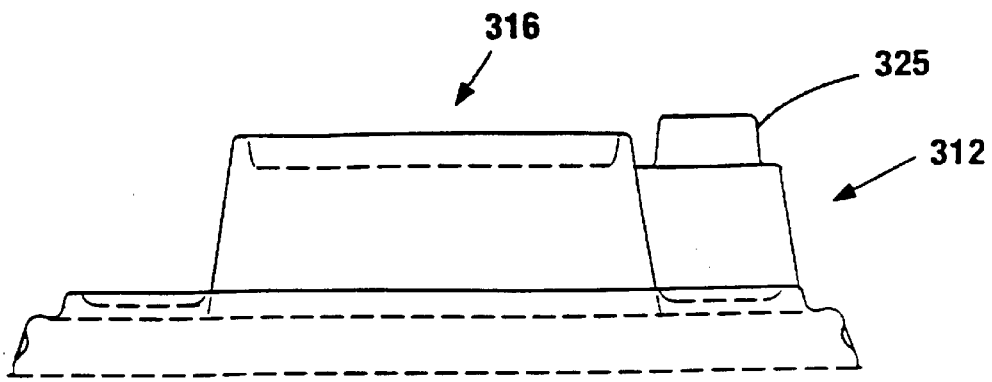
FIG. 13 is a side elevational view of the bottom part of FIG. 11.
Figure 14:
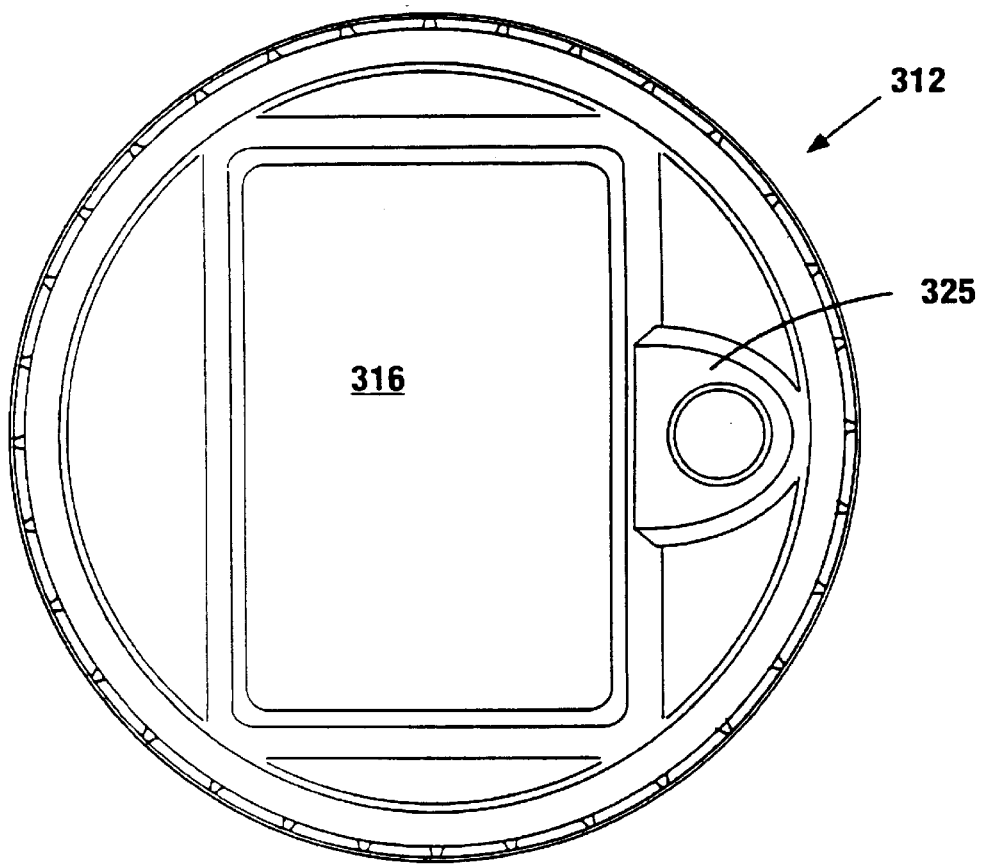
FIG. 14 is another top planar view of the bottom part of FIG. 11, rotated by 90 degrees.

Referring now to FIGS. 5 and 6 a third exemplary embodiment of the invention will now be briefly described. The embodiment of FIGS. 5 and 6 is similar to that of the foregoing embodiments and only pertinent differences will be described in detail. As before, like components are represented with like reference numerals incremented accordingly.

FIGS. 5 and 6 illustrate a closure 210 similar to that of closure 10 of FIGS. 1 and 2 but having only a single member 212 corresponding to that of inner member 12 of FIGS. 1 and 2. Raised portion 224 includes holding tabs 250 configured to abut against inner edges of a central opening of a digital media disk 216 thereby securing the disk against a top surface of a discate central portion 212.1 of the single closure member. As shown most clearly in FIG. 6, a plurality of tabs are employed spaced radially around the perimeter of raised portion 224. Four such tabs are shown in FIG. 6. In other embodiments, more or fewer tabs may be used. In particular, three tabs may be appropriate in some instances. In other cases, a single rib extending entirely around the perimeter of the raised portion is preferred to a plurality of individual tabs.

By providing tabs or ribs on the central raised portion of the closure, the digital media disk is thereby secured without the need of a outer member. Nevertheless, the disk is still substantially protected from the liquid contents of the cup by virtue of tall sidewalls positioning the disk at a substantial height above the level of the liquid and by virtue of raised portion 224 upon which the cris-crossed slots are formed. To further protect the digital media disk, a sealing member 252 may be provided as shown in FIG. 5. The sealing member may be a thin foil sheet.

Referring now to FIGS. 7–14, a fourth exemplary embodiment of the invention will now be briefly described. The embodiment of FIGS. 7–14 is similar to that of the foregoing embodiments and only pertinent differences will be described in detail. As before, like components are represented with like reference numerals incremented accordingly. For clarity is illustrating the fourth embodiment, four views of a top or upper part of the embodiment are provided (FIGS. 7–10) and four views of the bottom or inner part of the embodiment are separately provided.

FIGS. 7–14 illustrate a closure 310 wherein an inner member 312 and an outer member 314 are configured to provide a rectangular compartment 316 for holding a booklet or the like, rather than a disk-shaped compartment for holding a digital media disk. Raised portions 324 and 325 of the outer and inner members, respectively, are offset from the center of the closure such that a straw inserted through the closure into a cup passes along side compartment 316 rather than through the compartment such that contents within the compartment need not have a central hole or opening. The embodiment of FIGS. 7–14 nevertheless shares many of the same advantages of that of FIGS. 1 and 2 including: the provision of a tall sidewall as part of the inner and outer members; the provision of a raised portion of the inner member upon which crossed slits are formed; and the positioning of a bottom surface of the compartment well above the level of any liquid within the cup.

Referring now to FIGS. 15–18, a fifth exemplary embodiment of the invention will now be briefly described. The embodiment of FIGS. 15–18 is similar to that of the foregoing embodiments and only pertinent differences will be described in detail. As before, like components are represented with like reference numerals incremented accordingly.

Figure 15:
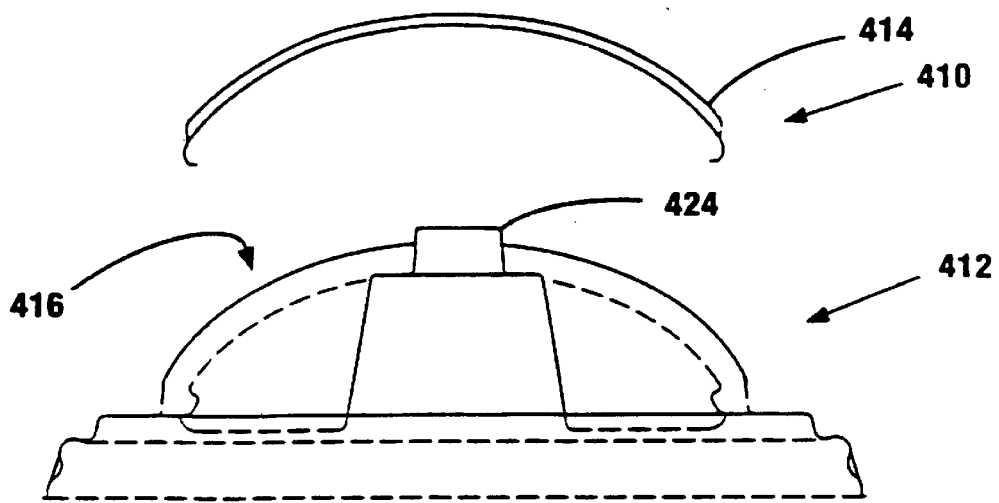
FIG. 15 is an front exploded view of a merchandise container closure of a fifth exemplary embodiment of the invention.
Figure 16:
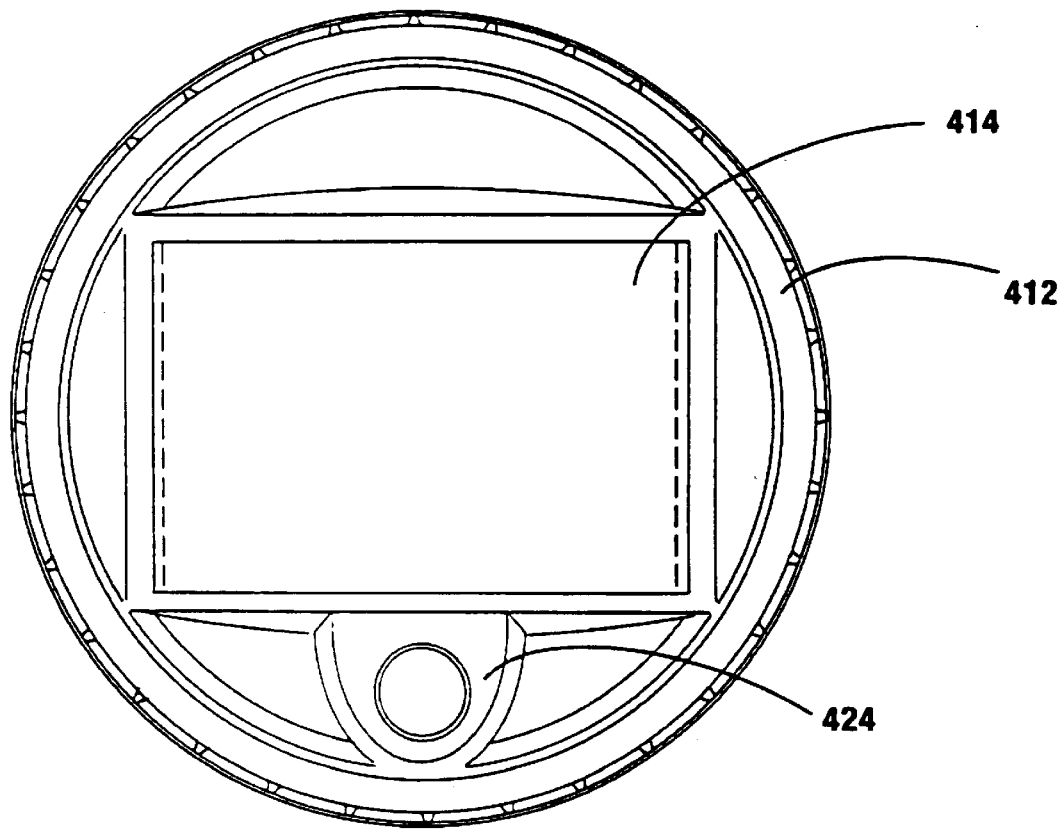
FIG. 16 is a top planar view of the container of FIG. 15.
Figure 17:
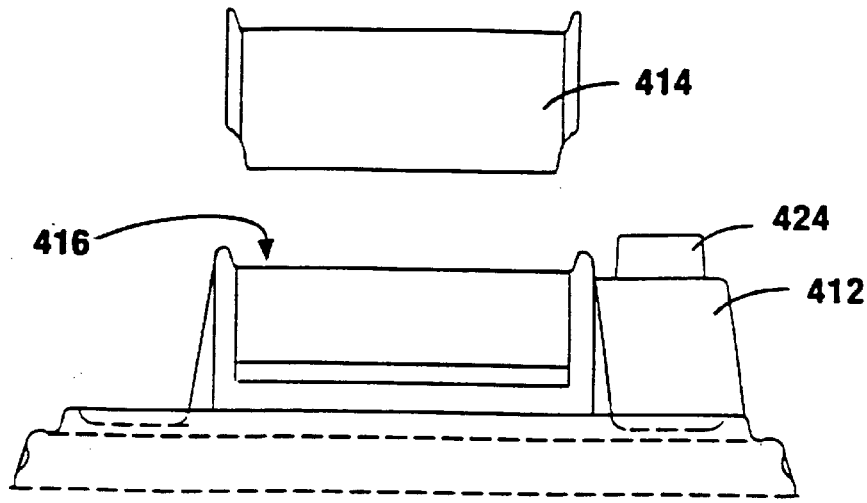
FIG. 17 is a side exploded view of the closure of FIG. 15.
Figure 18:
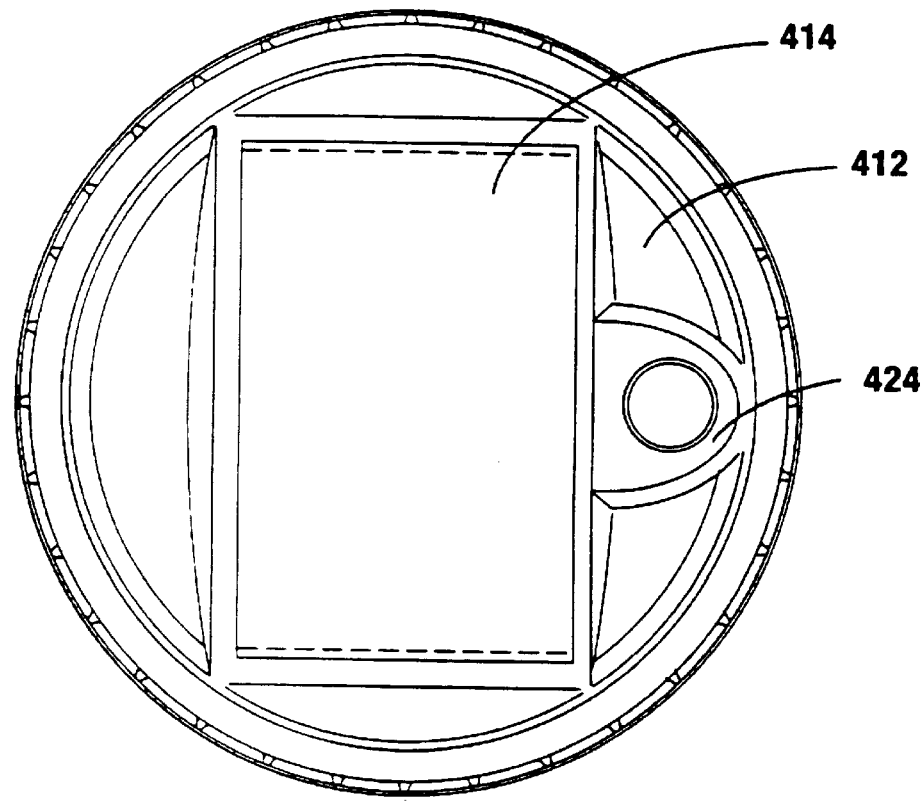
FIG. 18 is another top planar view of the closure of FIG. 15, rotated by 90 degrees.

FIGS. 15–18 illustrate a closure 410 wherein an inner member 412 and an outer member 414 are configured to provide a curved compartment 416 for holding a booklet or the like, rather than a disk-shaped compartment for holding a digital media disk. As best seen in FIGS. 15 and 17 the upper member is a small curved member sized and configured to snap onto the top of the inner member to form a compartment therebetween. Hence, the embodiment of FIGS. 15–18 is similar in some respects to the embodiment of FIGS. 3 and 4 wherein an upper member is sized to snap onto a top of the inner member rather than to substantially cover the inner member as with the other embodiments. In other respects, the embodiment of FIGS. 15–18 is similar to the embodiment of FIGS. 7–14 wherein a raised portion 424 of the inner member is offset from the center of the closure such that a straw inserted through the closure into a cup passes along side the compartment rather than through the compartment.

Figure 19:
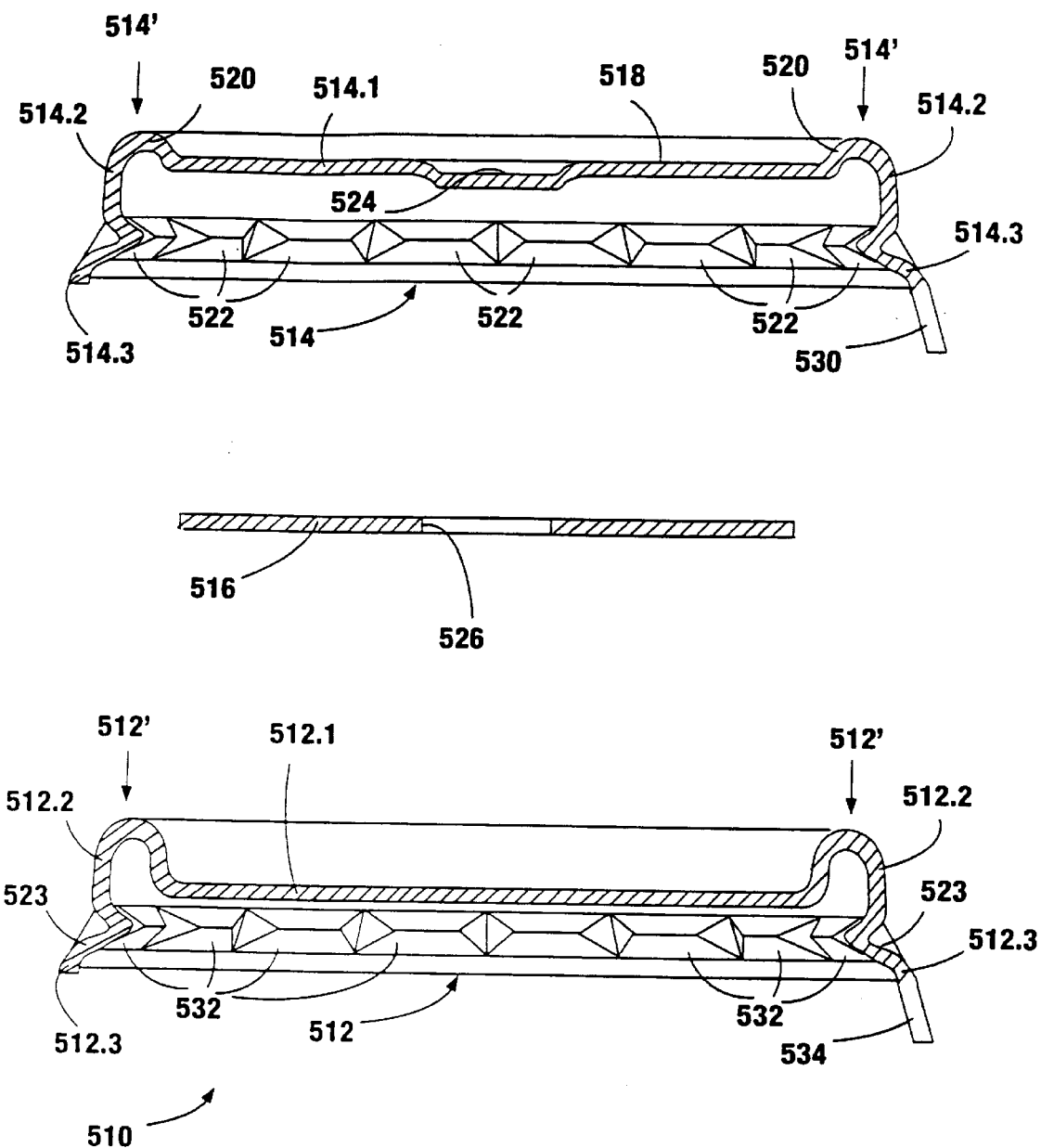
FIG. 19 is an exploded cross-sectional view of a merchandise container closure of the sixth exemplary embodiment of the invention, taken on a plane which contains the axis of symmetry of the closure.
Figure 20:
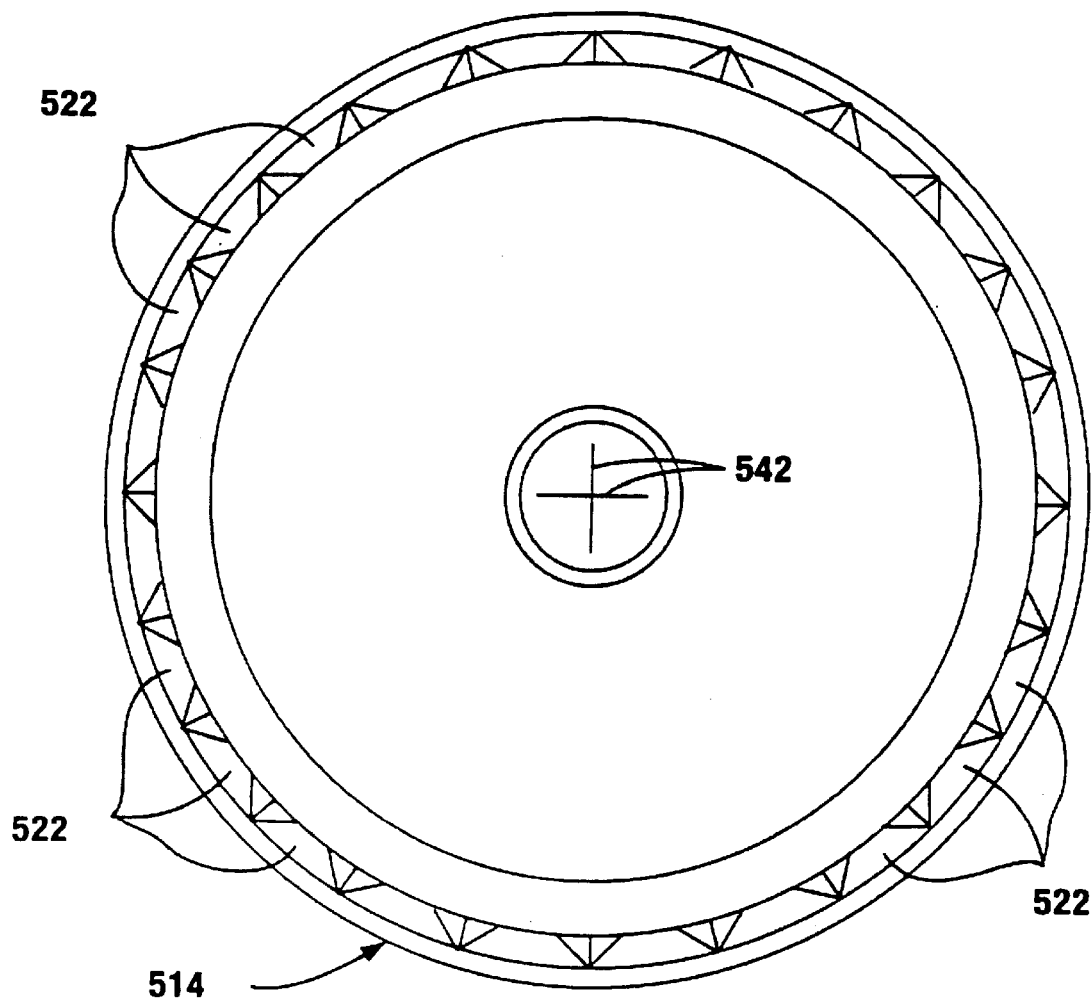
FIG. 20 is a top view of the outer member of the closure of the embodiment of the invention shown in FIG. 19.
Figure 21:
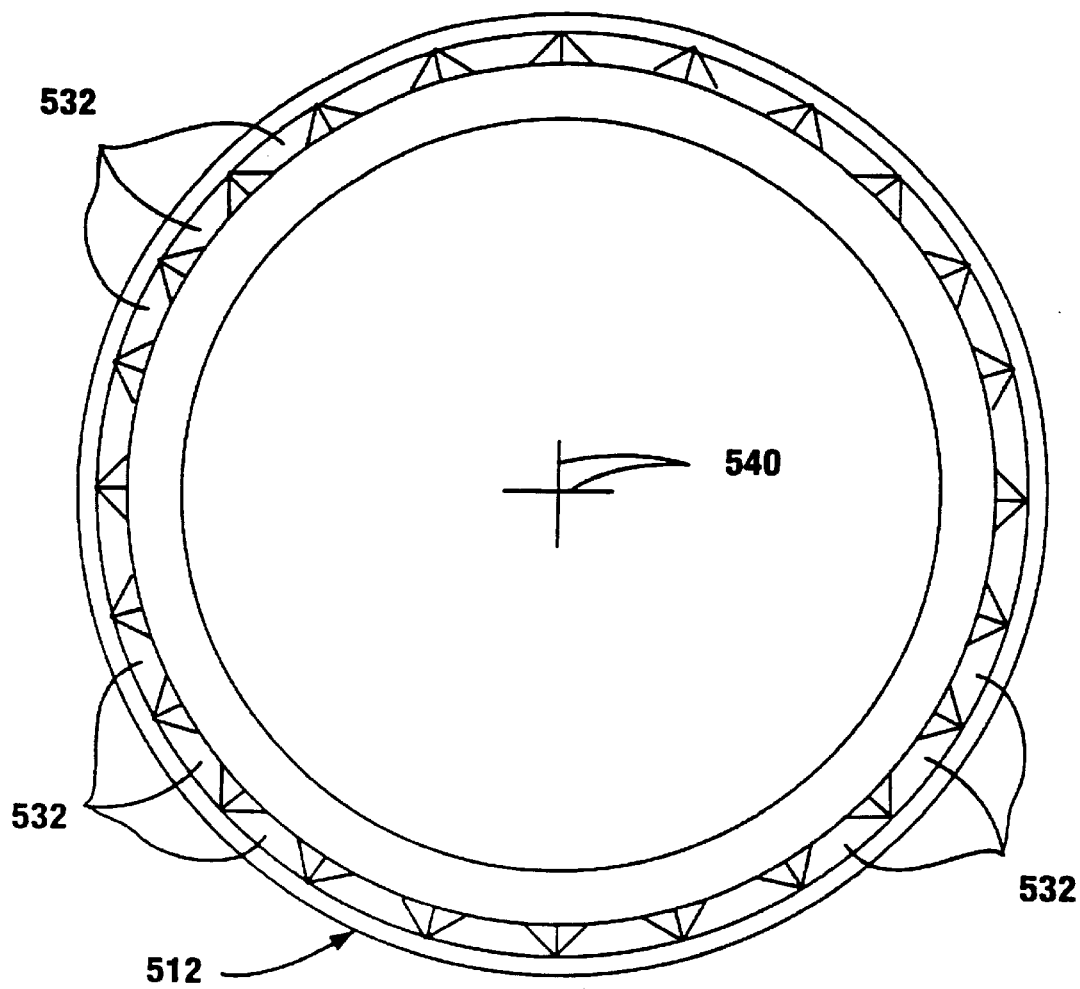
FIG. 21 is a top view of the inner member of the closure of the embodiment of the invention shown in FIGS. 19 and 20.

Referring now to FIGS. 19–21, a sixth exemplary embodiment of the invention will now be described. The embodiment of FIGS. 19–21 is similar to that of the foregoing embodiments and only pertinent differences will be described in detail. As before, like components are represented with like reference numerals incremented accordingly.

FIGS. 19–21 illustrates a closure 510 comprised of an inner member 512 and an outer member 514. A compact disk or CD recording 16 is captive between inner member 512 and outer member 514. As may be seen by comparison of FIGS. 19 and 20, outer member 514 has a discate central portion 514.1 around the periphery of which is erected a shallow, cylindrical flange 514.2. Thus, it will be seen that outer member 514 generally takes the form of a very shallow cup. As will be seen in FIG. 19, a slight recess or depression 518 is formed in the discate portion 514.1 of outer member 514, the wall 520 of which depression serves to stiffen outer member 514 in the well-known manner. As also seen in FIG. 19, a trunco-conical flange 514.3 extends outwardly from the lower edge of cylindrical flange 514.2 remote from discate part 514.1. A plurality of protrusions 522 project inwardly from the inner face of truncoconical flange 514.3. In practice a much larger number of protrusions 522 may be provided. A suitable depression 523 is provided in the outer face of the trunco-conical flange 514.3 of inner member 512 for receiving protrusions 522, and thus locking inner member 512 and outer member 514 together in nesting relationship when inner member 512 is registered with and then pushed into outer member 514.

It is to be understood that inner member 512 and outer member 514 are of such configuration that when they are locked together in the manner just described, a cavity is defined between them which is large enough to contain compact disk 516. As also seen in FIG. 19, a boss 524 is raised on the outer discate face of depression 518, and that boss 524 fits closely within the central opening 526 of compact disk 516. It follows, then, that boss 524 serves to maintain compact disk 516 substantially coaxial with the common axis of symmetry of closure members 512 and 514 when those members are locked together in the manner described herein-above and compact disk 516 is captive between inner member 512 and outer member 514.

As will be evident to those having ordinary skill in the plastics arts, informed by the present disclosure, truncoconical flange 514.3 is sufficiently resilient and flexible, and the extent of projection of protrusions 522 into depression 523 is so limited, that outer member 514 can be separated from inner member 512 by pulling outwardly and upwardly on a single point of trunco-conical flange 514.3. A manually graspable pull tab 530 will be provided at a point on the outer periphery of trunco-conical flange 514.3 in order to render it easy for the purchaser to apply such a pulling force to outer member 514, and thus to separate it from inner member 512, whereby to gain access to compact disk 516.

Referring again to FIG. 19, it will be seen that inner member 512 is comprised of a discate portion 512.1, a substantially cylindrical flange portion 512.2 and a trunco-conical flange portion 512.3. These portions of inner member 512 correspond generally to the correspondingly denominated portions of outer member 514. As also seen in FIG. 19, trunco-conical flange portion 512.3 is provided with inwardly projecting protrusions 532 which are similar to the inwardly projecting protrusions 522 of outer member 514. Protrusions 532 are so constructed and arranged as to efficiently cooperate with a part of the merchandise container upon which closure 510 is to be mounted. Thus, for example, if closure 510 is to be mounted upon an aluminum soft drink can of well known type, protrusions 532 will be constructed and arranged to engage with the bead or some other structural feature of that soft drink can, whereby to lock closure 510 onto the upper end of that soft drink can.

A pull tab 534, corresponding to pull tab 530, may be provided on the periphery of trunco-conical flange 512.3, whereby closure 510 as a whole may readily be removed from the soft drink can or other associated merchandise container when it is desired to remove closure 510 without gaining access to compact disk 516.

As best seen in FIGS. 20 and 21, pairs of intersecting slits 540, 542 may be provided, respectively, in inner member 512 and outer member 514, whereby a soda straw may be thrust through members 512 and 514, and into the interior of the associated merchandise container, in those applications of the invention in which the merchandise container is an open-topped cup or the like, and closure 510 is the only closure, as when soft drinks are supplied at fast food restaurants.

The inner and outer members of closure 510 may be fabricated by vacuum-forming or injection-molding certain well known plastic materials, in the well known manner. The thickness of the plastic sheet material from which blanks are formed, when vacuum forming, may range from about 0.005 inches to, in some extreme cases, about 0.060 inches or more. These sheet materials may be clear or opaque, or a combination of clear and opaque. A suitable material in some applications may be styrene. Compact disk 516 may be, in certain applications of the invention, replaced by other products, such as promotional materials, incentive "bonus" offers, product samples, etc.

Figure 22:
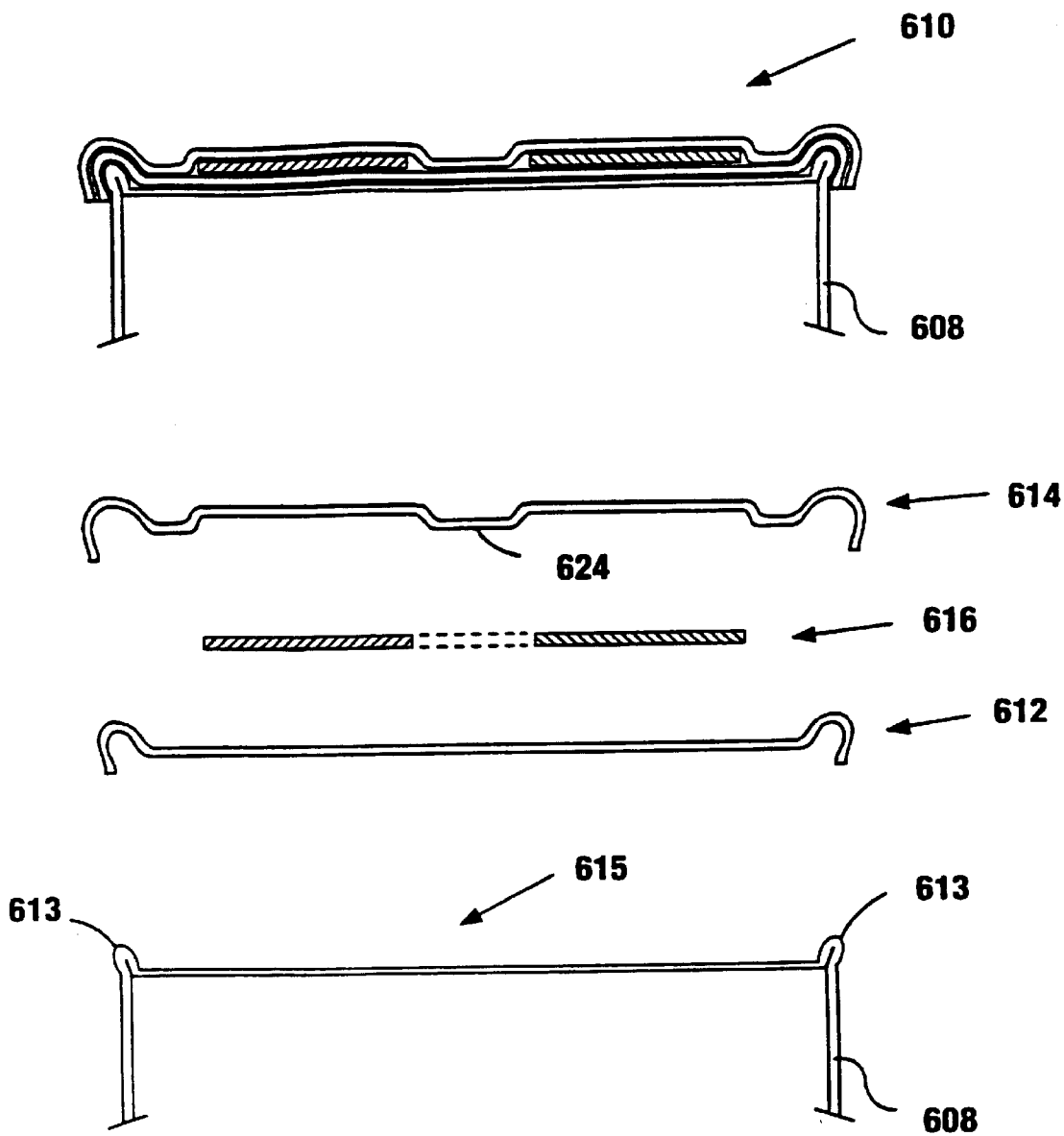
FIG. 22 is a side elevational view of a seventh exemplary embodiment providing a closure mounted to a can.

The merchandise containers in certain applications of the present invention may be popcorn buckets, soft drink cans, beer cans, motor oil cans, cans used in the vending of certain cooked foods such as tomatoes, and cans of the special size in which peanuts are vended. FIG. 22 illustrates an embodiment wherein a closure 610 is mounted to a conventional can 608. The closure includes an inner member 612 and an outer member 614 forming a compartment sized for receiving a digital media disk 616 as shown. A central depressed portion 624 of upper member 614 extends downwardly into a central hole of the digital disk to help secure the disk. Peripheral edges of the inner and outer members snap onto a rim 613 of the can. The closure is sized and configured to position the digital disk within a depression 615 of can 608 below the top level of rim 613. Hence, the presence of the closure and disk contained therein does not significantly add to the overall height of the can allowing the can to be easily packaged and stacked along with other cans.

Figure 23:
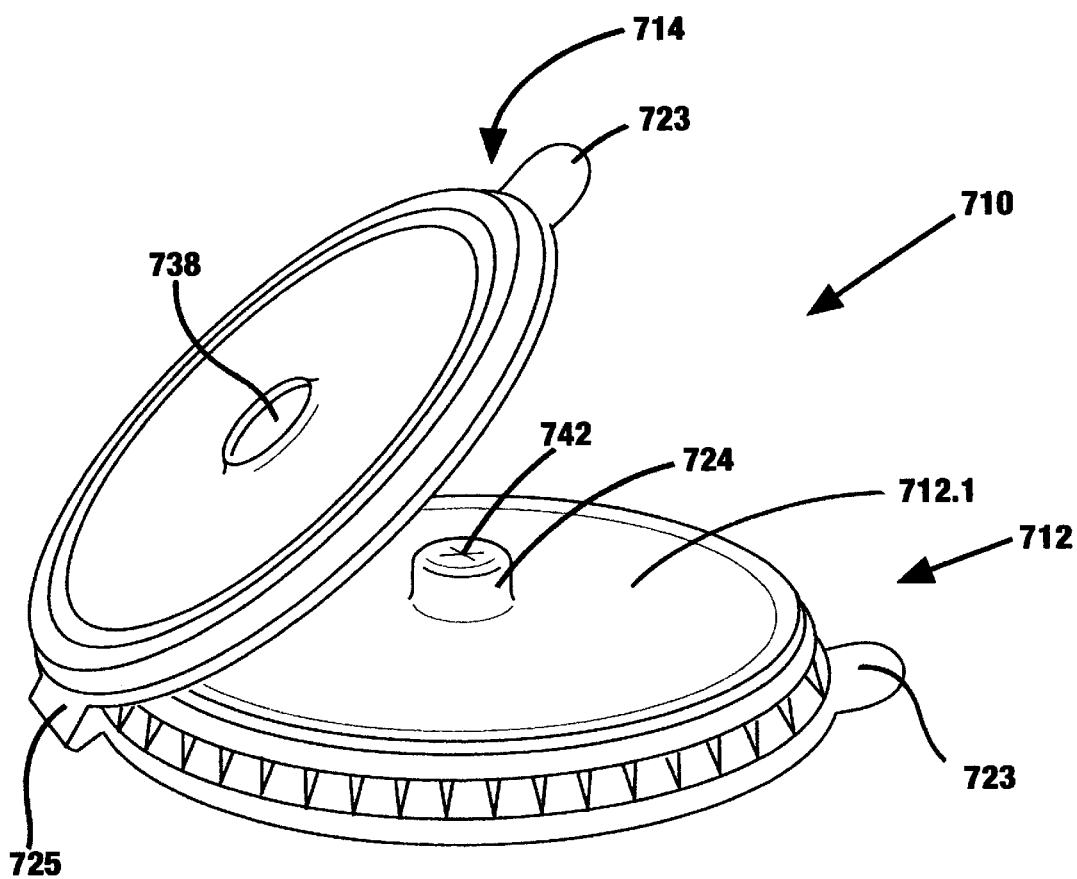
FIG. 23 is a perspective view of an eighth exemplary embodiment providing a hinged lid for mounting to a drink container wherein the lid forms a fully enclosed compartment.
Figure 24:
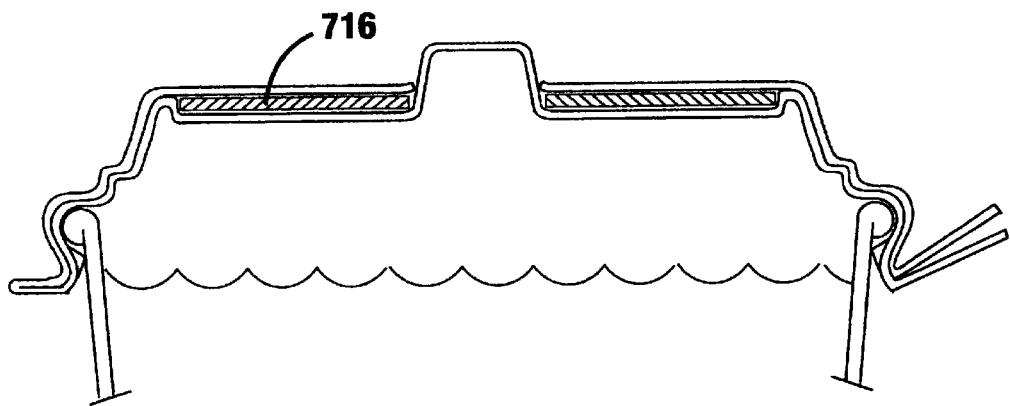
FIG. 24 is a side cross-sectional view of the hinged lid of FIG. 23.
Figure 25:
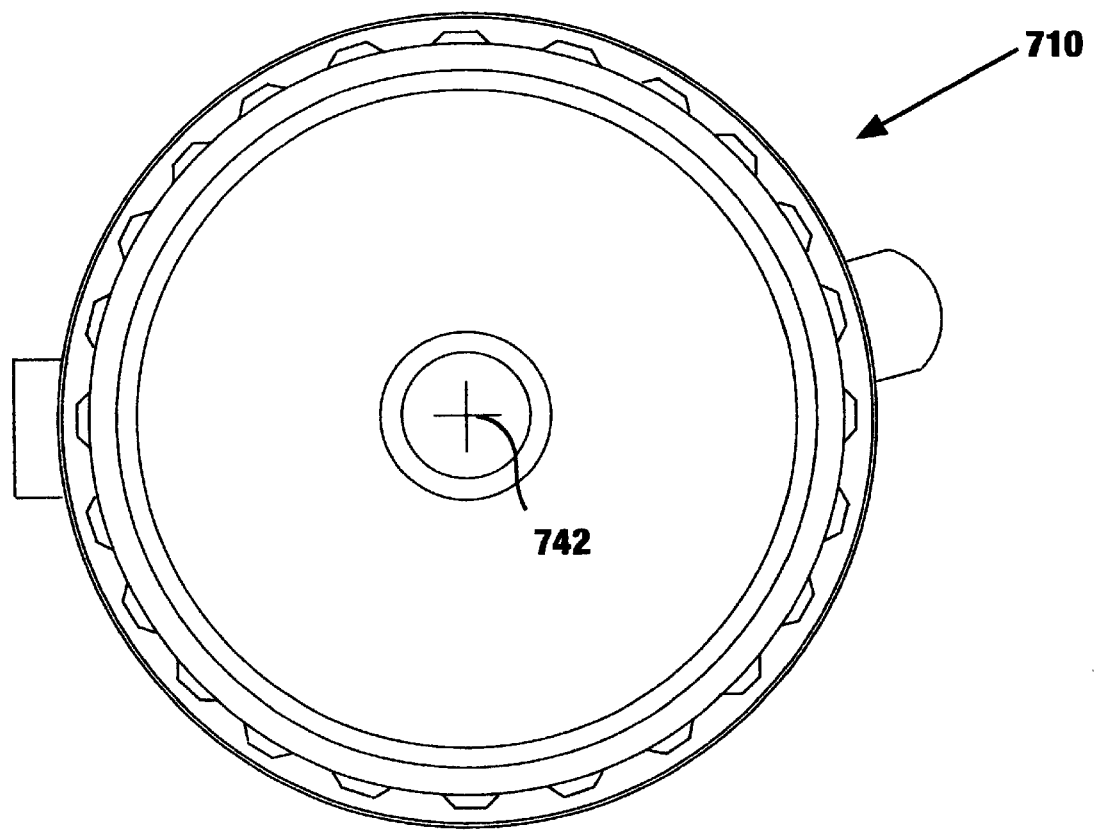
FIG. 25 is a top planar view of the hinged lid of FIG. 23.

FIGS. 23–25 illustrate a hinged closure 710 configured for mounting to a conventional drink cup container, such as the type commonly employed in quick service restaurants, and for enclosing a digital media disk, such as a CD-ROM, therein. Closure 710 includes an inner member 712 and an outer member 714 connected by a hinge 725 and forming a disk-shaped compartment. The inner member includes a central top discate surface 712.1 for receiving a digital media disk 716 (not shown in FIG. 23). A central opening of the digital media disk surrounds an elevated pedestal 724 having a pair of crossed slits 742 for receiving a straw. Outer member 714 includes an opening 738 which accommodates pedestal 724 when the outer member is mounted to the inner member. A pair of tabs 723 are provided on the inner and outer members to permit easy opening of the compartment or to facilitate removal of the inner member from the drink cup.

With this configuration, a digital media disk is closely received within the diskshaped compartment formed between the inner and outer members while the outer member is fitted to the inner member. Inner peripheral edges of the outer member surrounding opening 738 are sized to frictionally bear against outer side wall surfaces of pedestal 724 to prevent seepage of liquid into the compartment. Hence, if any beverage from within the drink cup leaks through slits 742, the beverage is substantially prevented from leaking into the compartment containing the digital media disk. The provision of the hinge permits the entire enclosure to be made from a single blank of material so as to reduce fabrication costs. In use, a digital media disk is placed on the top surface of the inner member, then the outer member is pivoted along hinge 725 to mount the outer member to the inner member thereby enclosing the digital media disk therein. The entire closure is then mounted to a drink cup.

Figure 26:
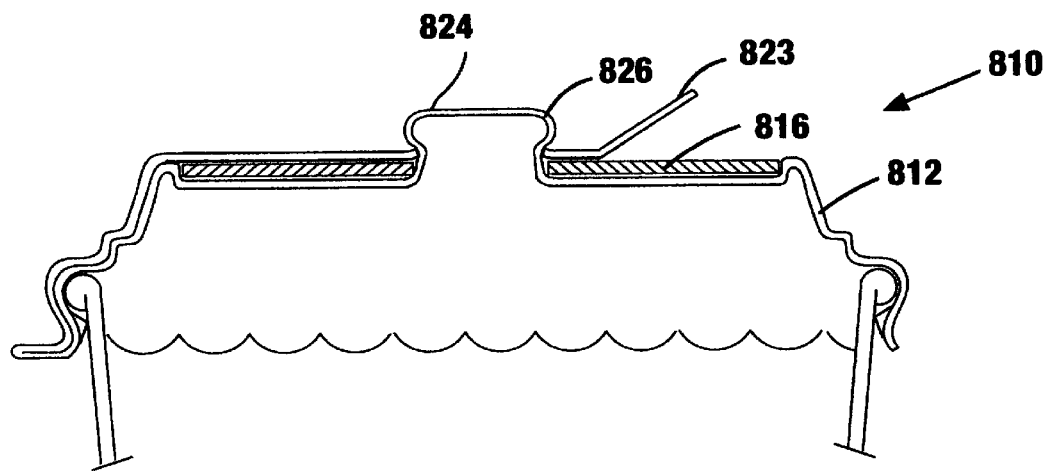
FIG. 26 is a side cross-sectional view of a ninth exemplary embodiment of the invention providing a hinged lid wherein the hinged lid forms a compartment that is partially open.
Figure 27:
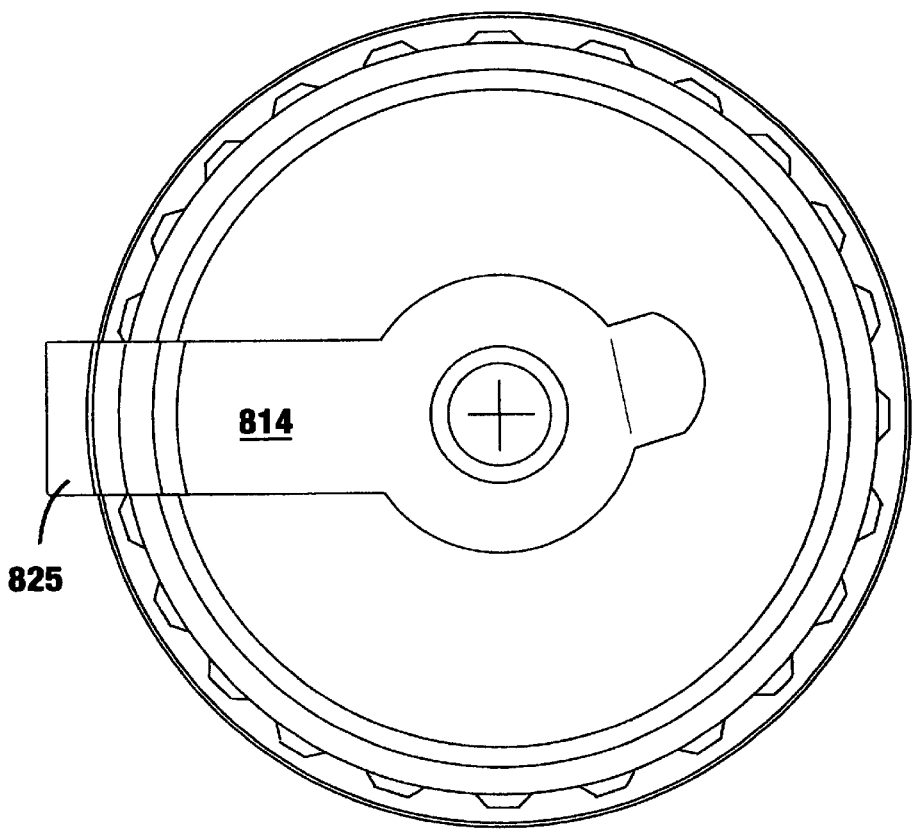
FIG. 27 is a top planar view of the lid of FIG. 26.

FIGS. 26 and 27 illustrate a ninth embodiment of the invention, similar to the embodiments of FIGS. 23–25 but wherein an outer member covers only a portion of the inner member thereby leaving a large portion of the digital media disk visible. Briefly, closure 810 of FIGS. 26 and 27 includes inner and outer members 812 and 814 connected by hinge 825. Outer member 814 includes a tab 823 to facilitate removal of the outer member from around a central pedestal 824 of the inner member. Pedestal 824 includes, as seen most clearly in FIG. 26, a protruding rim 826. An opening of the outer member is sized to bear against sidewalls of the pedestal immediately below rim 826. In this manner, the outer member holds a digital media disk 816 snugly against the inner member. Preferably, the material of the outer member is sufficiently resilient to permit the outer member to be passed over the pedestal and subsequently removed therefrom without significant effort.

By providing a container closure which leaves a large portion of the digital media disk exposed, a customer can view the disk prior to withdrawal of the upper member. Because the digital media disk is at least partially exposed, there is a somewhat greater risk of seepage of beverage from the drink container onto the digital media disk. However, sidewalls of the inner member and sidewalls of the pedestal position slits of the pedestal well above the level of beverage within the drink cup such that it is unlikely that any beverage will seep through the slits. Even if a portion of the beverage does seep through the slits, it will likely initially spill onto only a top surface of the outer member, permitting the customer to remove the beverage before it might reach the digital media disk.

Figure 28:
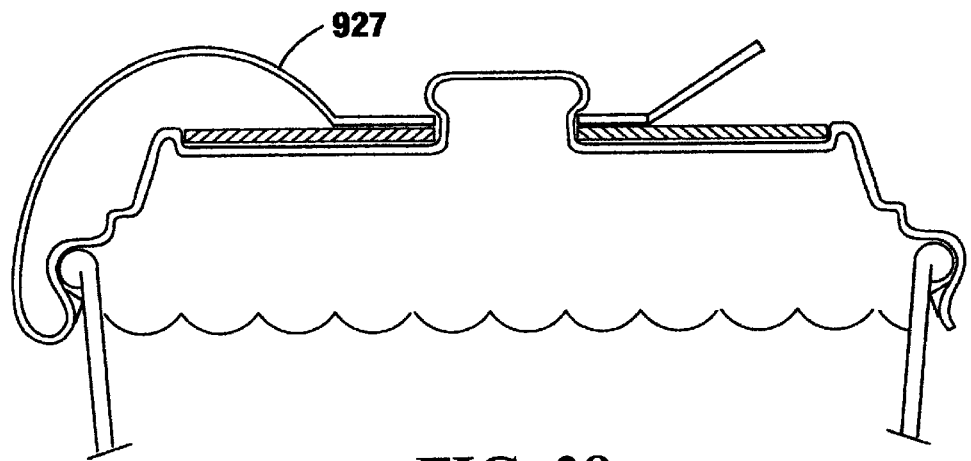
FIG. 28 is a side cross-sectional view of a tenth embodiment of the invention providing a hinged lid having a top part bowed outwardly with respect to a bottom part.
Figure 29:
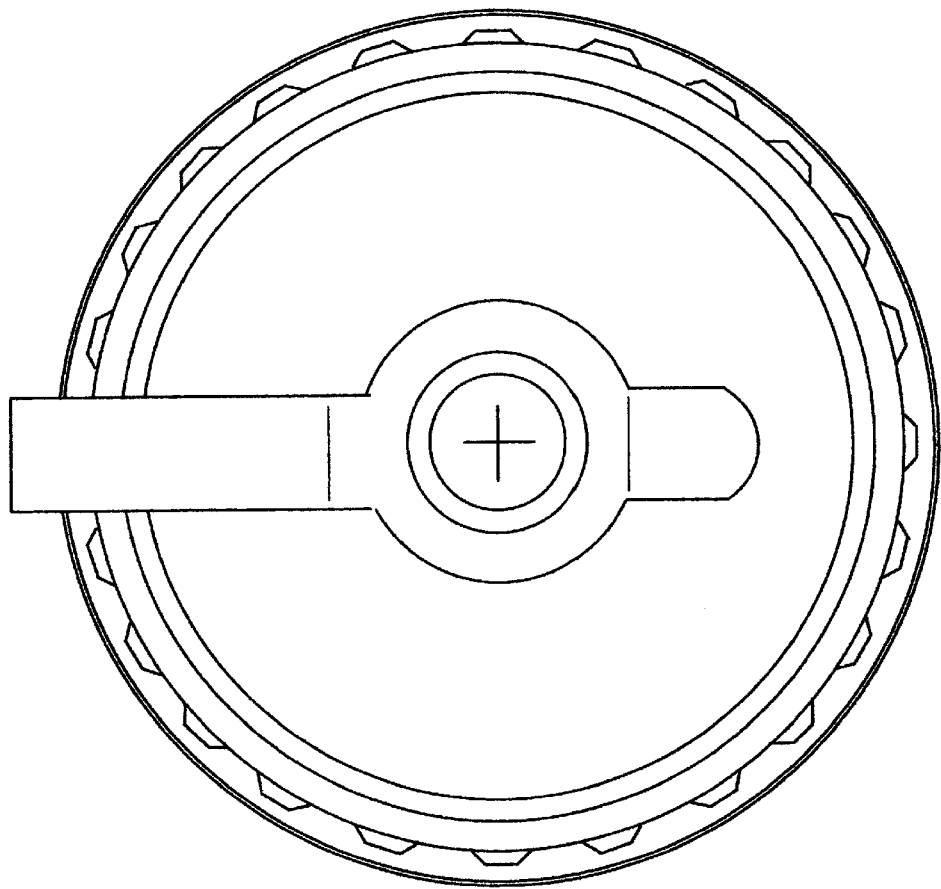
FIG. 29 is a top planar view of the lid of FIG. 28.

FIGS. 28 and 29 illustrate a tenth embodiment of the invention which is similar to that of FIGS. 26 and 27 but wherein a portion of the top part of the lid is bowed outwardly from a bottom portion. The bowed portion 927 permits a greater portion of the digital media disk to be viewed by a customer prior to removal of the outer member from the inner member. Moreover, the bowed portion permits easy removal of the entire closure from the drink container by permitting the customer to pass his or her finger under the bowed portion, then lift the bowed portion, and the inner member connected thereto, outwardly away from the top rim of the drink container.

Figure 30:
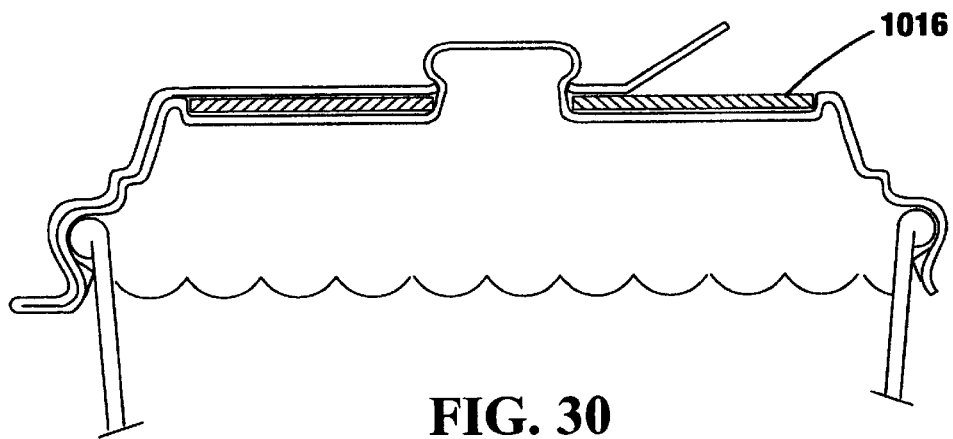
FIG. 30 is a side cross-sectional view of an eleventh embodiment of the invention providing a hinged lid wherein a top opaque or transparent part covers about half of a bottom part of the lid.
Figure 31:
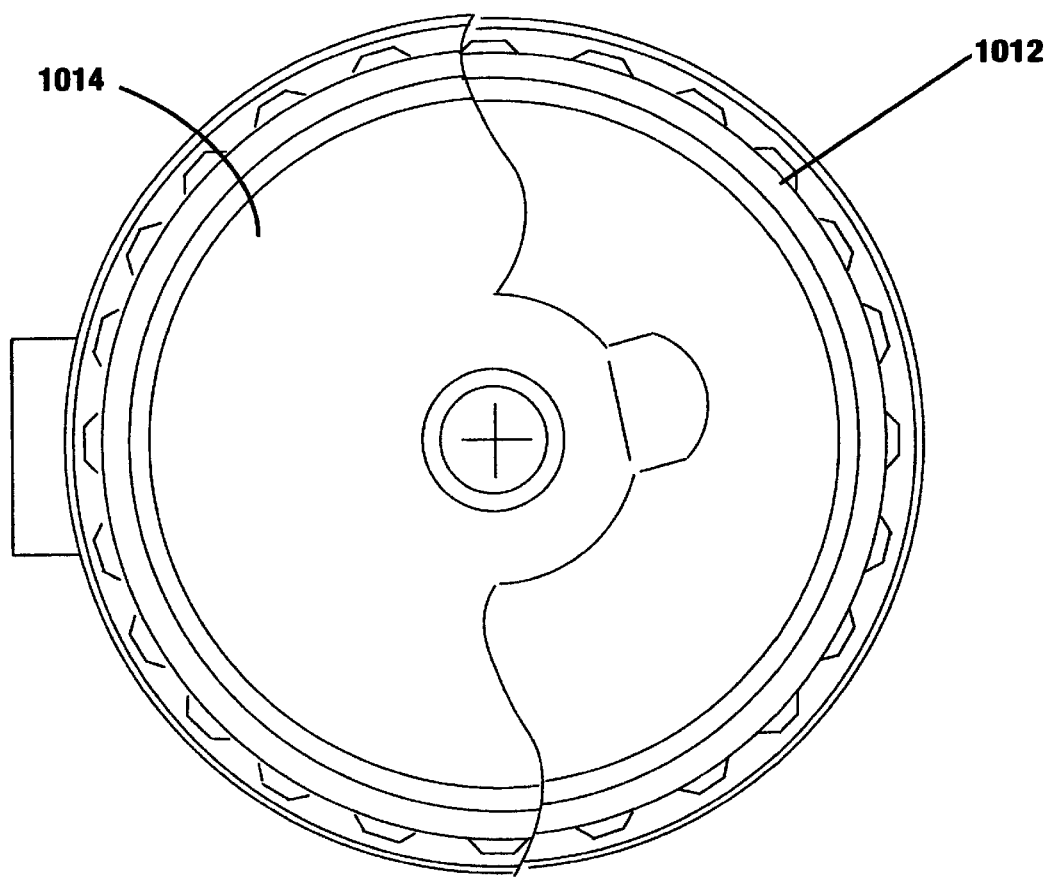
FIG. 31 is a top planar view of the lid of FIG. 30.

FIGS. 30 and 31 illustrate an eleventh embodiment of the invention wherein an outer member 1014 covers about half of a top discate surface of an inner member 1012. Hence, about half of a digital media disk mounted therein is viewable prior to removal of the outer member from the inner member. Thus, the digital media disk is held somewhat more securely against the inner member than in the immediately preceding embodiment while still permitting a substantial portion of the digital media disk to be viewed. Additionally, the outer member, and perhaps the inner member as well, are formed of an opaque or transparent material permitting viewing of the entire digital media disk even while the outer member is mounted to the inner member.

Figure 32:
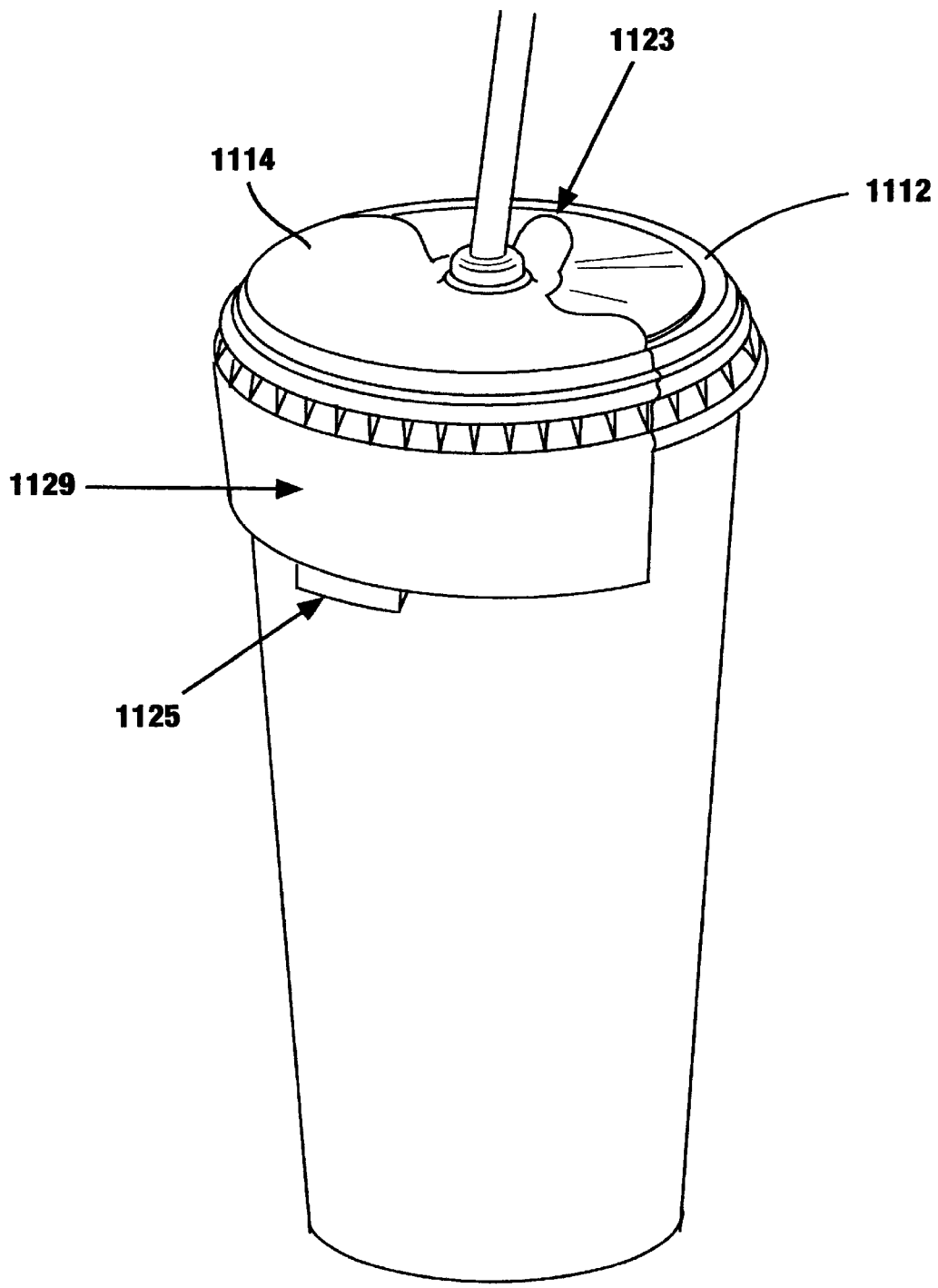
FIG. 32 is a perspective view of a twelfth embodiment of the invention providing a hinged lid with a display skirt.
Figure 33:
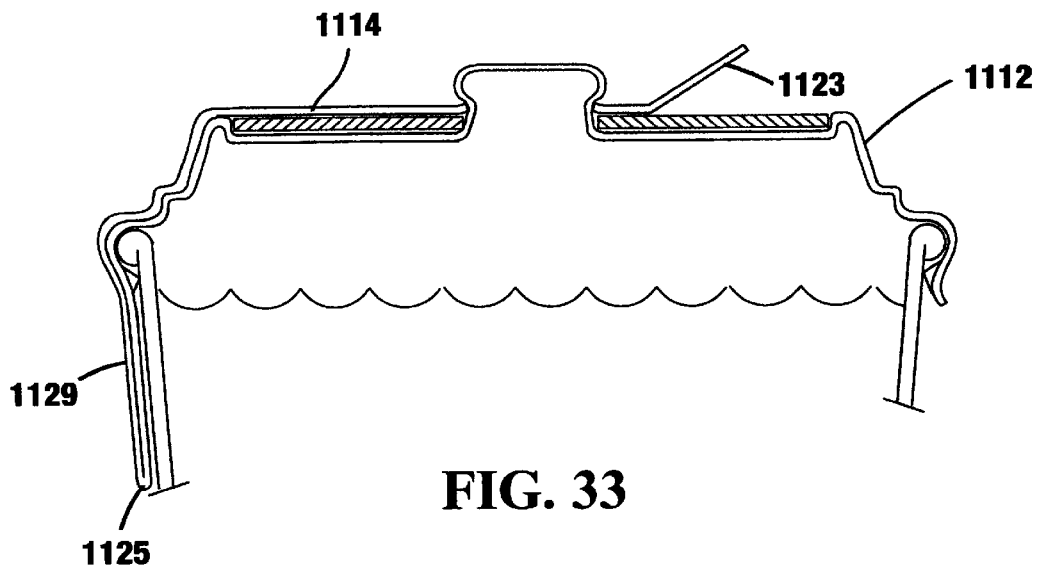
FIG. 33 is a side cross-sectional view of the hinged lid of FIG. 32.
Figure 34:
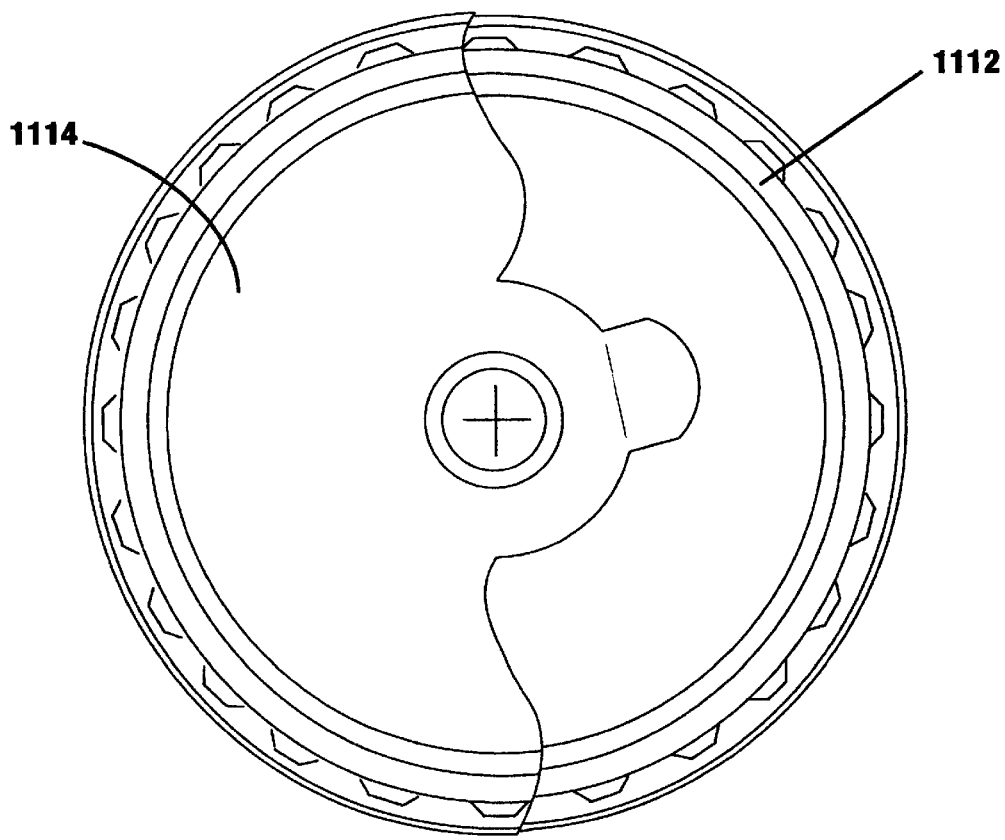
FIG. 34 is a top planar view of the hinged lid of FIG. 32.

FIGS. 32–34 illustrate a twelfth embodiment of the invention, similar to that of the embodiment of FIGS. 30 and 31, but wherein a skirt 1129 is additionally provided for enclosing display material, such as a cardboard of paper material having advertising or other indicia marked thereon. As can be seen most clearly in FIG. 32, the skirt portion 1129 extends downwardly perpendicular to inner and outer members 1112 and 1114 along a curved outer side wall of the drink cup. A hinge 1125 is mounted at a bottom end of the skirt portion connecting an inner and outer parts of the skirt portion.

In use, subsequent to removal of a straw from the drink cup, the outer member 1114 is pulled back from the inner member using pull tab 1123 thereby permitting removal of the digital media disk and also permitting removal of any material mounted within the skirt area. With this configuration, a digital media disk and a booklet or similar written material are both conveniently contained within a single drink cup lid. In the alternative, booklet material need not be enclosed within the skirt portion. Rather, an outer side surface of the skirt portion is used as a display area for receiving adhesively mounted display labels or the like.

FIGS. 35–44 illustrate various embodiments wherein a retaining mechanism is provided for retaining a digital media disk to a drink container lid such that an outer member is not required.

Figure 35:
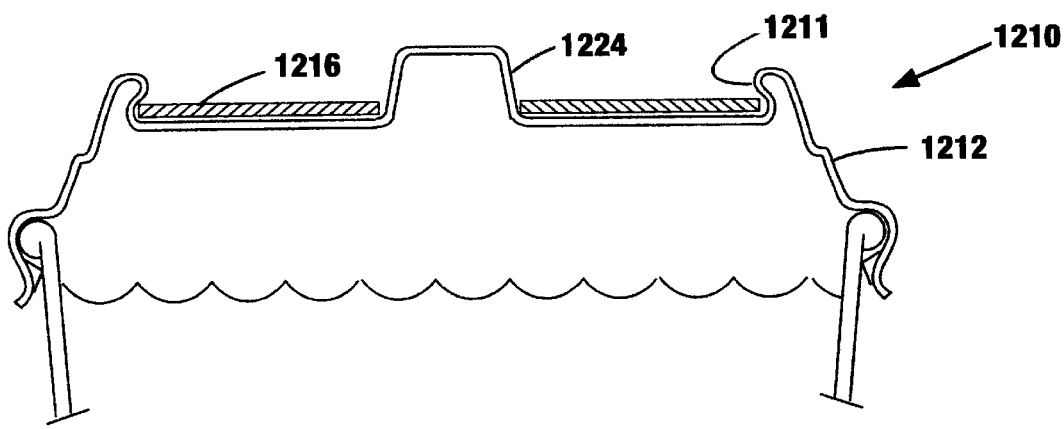
FIG. 35 is a side cross-sectional view of a thirteenth embodiment of the invention providing a container lid with a retaining mechanism for retaining a digital media disk.
Figure 36:
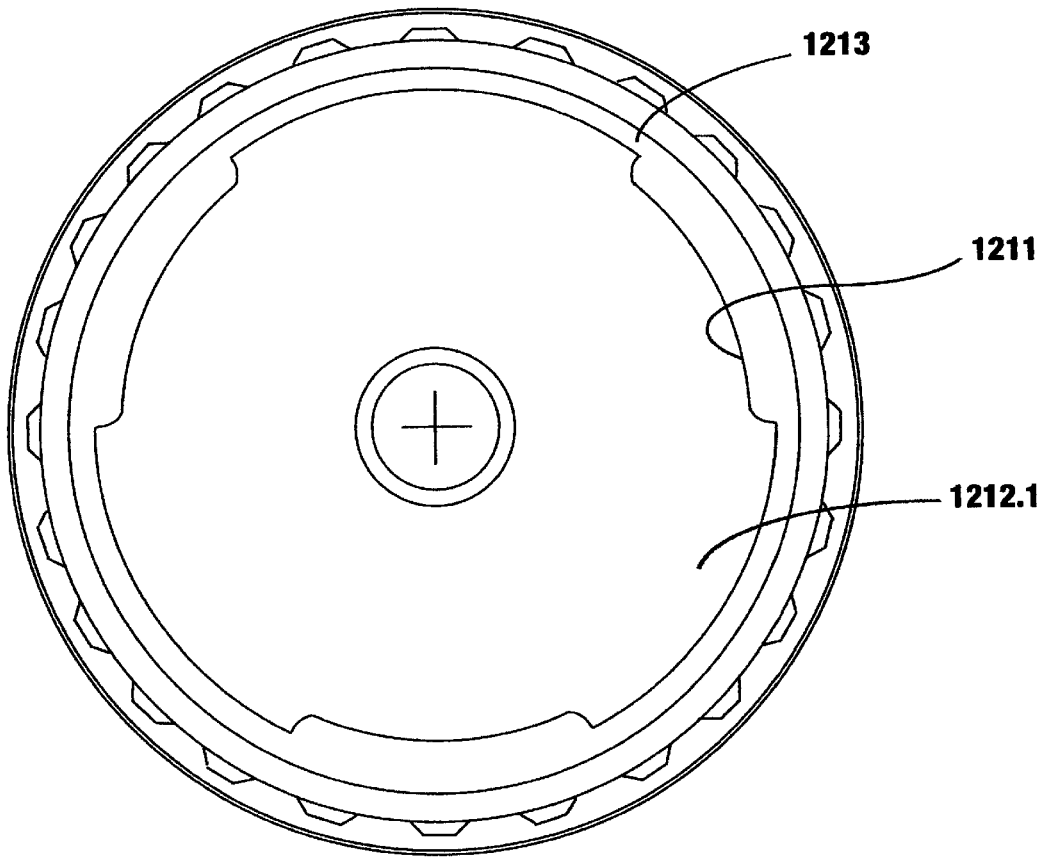
FIG. 36 is a top planar view of the embodiment of FIG. 35.

FIGS. 35 and 36 illustrate a thirteenth embodiment of the invention wherein a container cup lid 1210 includes a plurality of resilient tab members 1211 equally spaced around a central flat discate upper surface 1212.1. The resilient tab members are mounted on an upwardly extending rim 1213 which extends around a perimeter of the central discate portion. Each individual tab extends inwardly over a portion of the central discate member to thereby retain outer peripheral edges of a digital media disk 1216 positioned thereon.

With this embodiment, digital media disk 1216 is positioned on a top surface of the lid by pushing peripheral edges past the resilient tab members while aligning a central aperture of the digital media disk with a central pedestal 1224 of the container lid. In the specific embodiment of FIGS. 35 and 36, three resilient tabs are provided, equispaced around a perimeter of the digital media disk for securely retaining the disk against the container lid. To withdraw the digital media disk, one or more of the resilient members are manually bent outwardly, permitting removal of the disk. By providing a single piece lid with a retaining mechanism, rather than a two piece lid, overall production costs are typically reduced. The disk is exposed to view such that a customer can read a label on the disk prior to removal of the disk from the lid. Sidewalls of the lid and sidewalls of the central pedestal are sufficiently high such that the risk of seepage of beverage through crossed slits of the pedestal is relatively minimal and hence the digital media disk is relatively immune from possible damage from the beverage.

Figure 37:
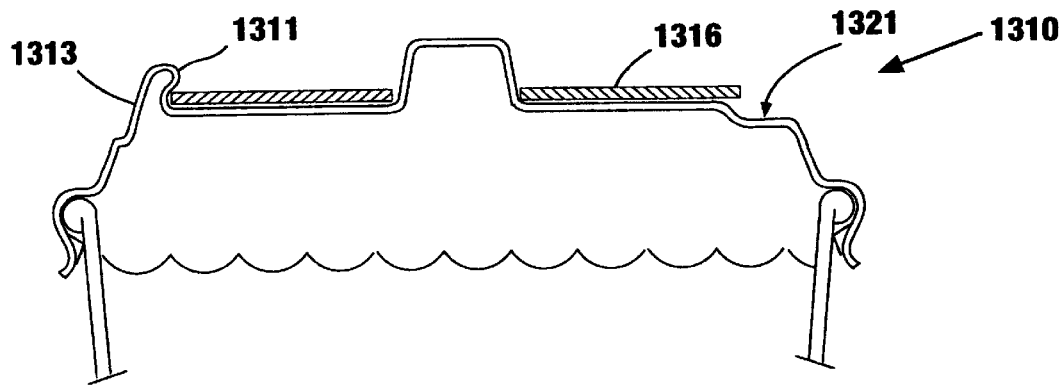
FIG. 37 is a side cross-sectional view of a fourteenth embodiment of the invention having a plurality of resilient tabs for retaining a digital media disk to a drink container lid.
Figure 38:
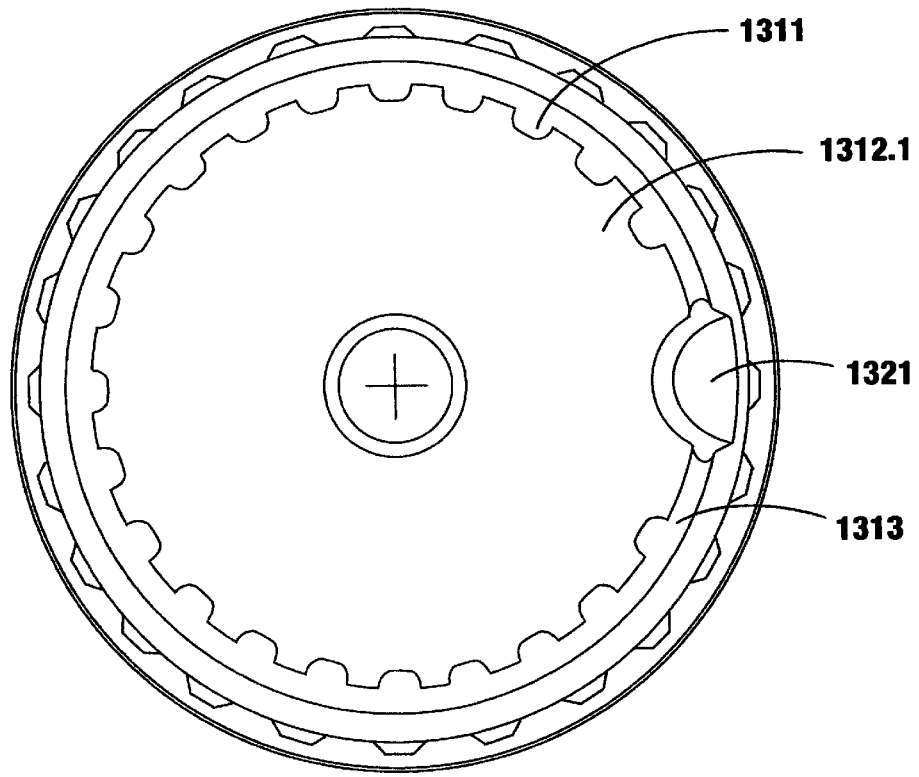
FIG. 38 is a top planar view of the lid of FIG. 37.

FIGS. 37 and 38 illustrate an alternative embodiment to that of FIGS. 35 and 36 wherein a large number of resilient tabs 1311 are positioned around a perimeter of a central discate top surface 1312.1 of the closure 1310. Additionally, the lid includes a downwardly formed notch 1321 formed at the periphery of the discate portion. Hence, the resilient tabs extend around most, but not all, of the perimeter of the discate portion. The notch 1321 permits easy removal of a digital media disk 1316 by insertion of a thumb or finger into the notch below the outer perimeter of the disk. The disk is then pulled upwardly at its outer perimeter to remove the disk from under the resilient retaining tabs. By providing an entire set of retaining tabs, rather than only three as in the preceding embodiment, the disk member may be even more securely mounted to the container lid. The notch portion, however, permits easy removal of the digital media disk.

Figure 39:
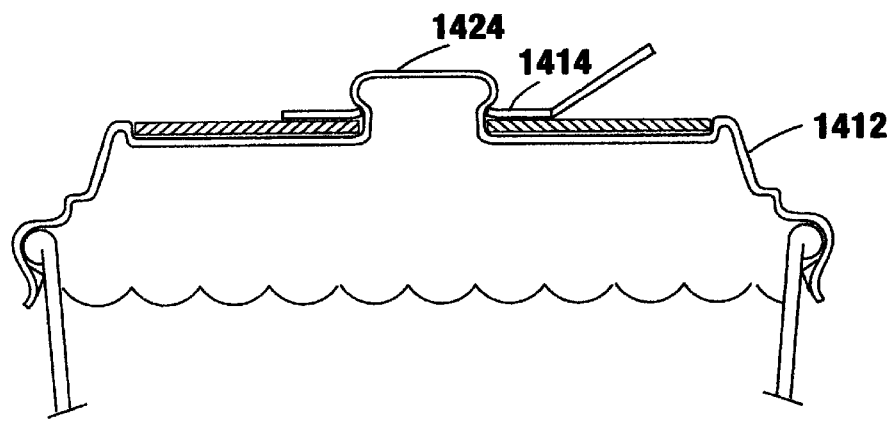
FIG. 39 illustrates a fifteenth embodiment of the invention providing a diskshaped retaining mechanism for retaining a digital media disk to a container cup lid.
Figure 40:
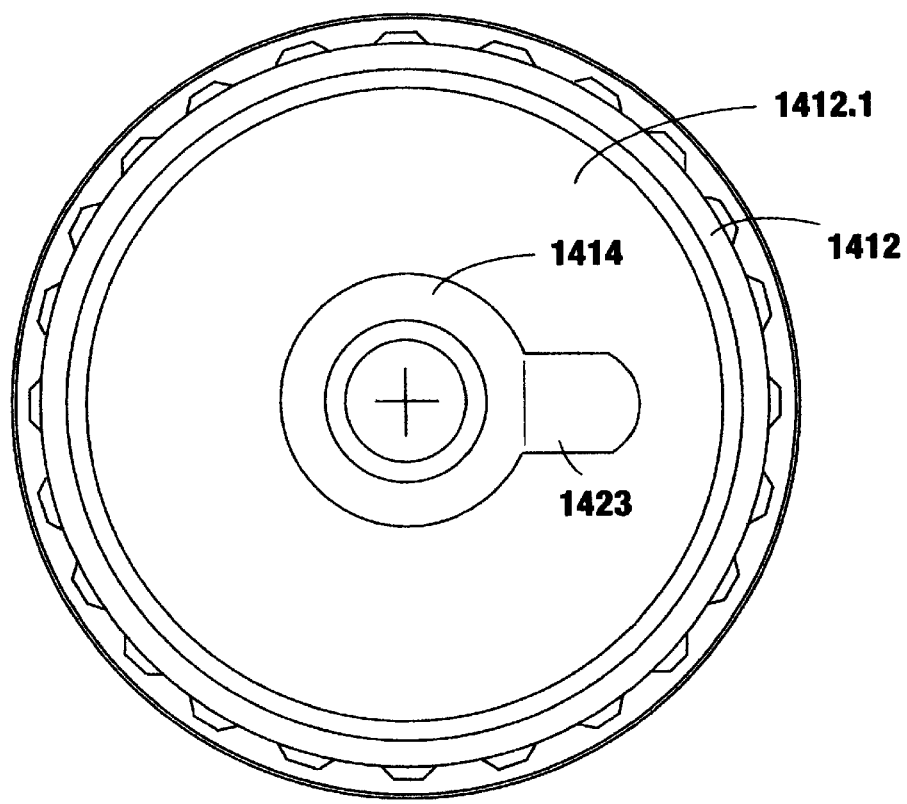
FIG. 40 is a top planar view of the lid of FIG. 39.

FIGS. 39 and 40 illustrate a fifteenth embodiment of the invention wherein a retaining mechanism is provided in the form of a central outer disk member 1414 is mounted around a central pedestal 1424. As with the embodiment of FIGS. 26 and 27, the pedestal includes an outwardly extending rim 1426. Outer member 1414 includes a central opening sized to fit snugly around outer side walls of pedestal 1424 below the rim to thereby retain a digital media disk snugly against a top discate surface 1412.1 of a bottom portion 1412 of the lid. In this manner, a substantial portion of the digital media disk can be viewed prior to removal of the outer member, yet the digital media disk is securely retained against the lid. A tab 1423 is provided to facilitate removal of the outer member 1414 from pedestal 1424.

Figure 41:
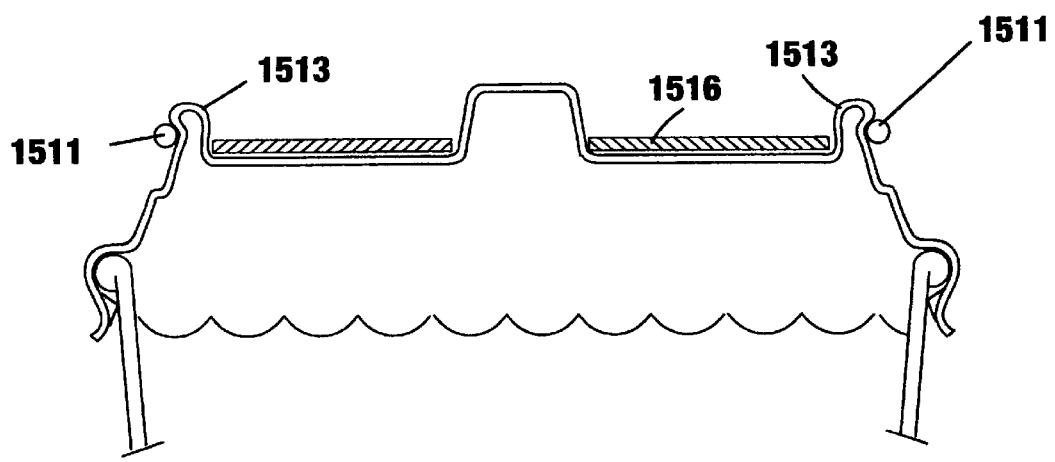
FIG. 41 is a side elevational view of a sixteenth embodiment of the invention providing a retaining mechanism in the form of an elastic retaining band for retaining a digital media disk to a drinking cup lid.
Figure 42:
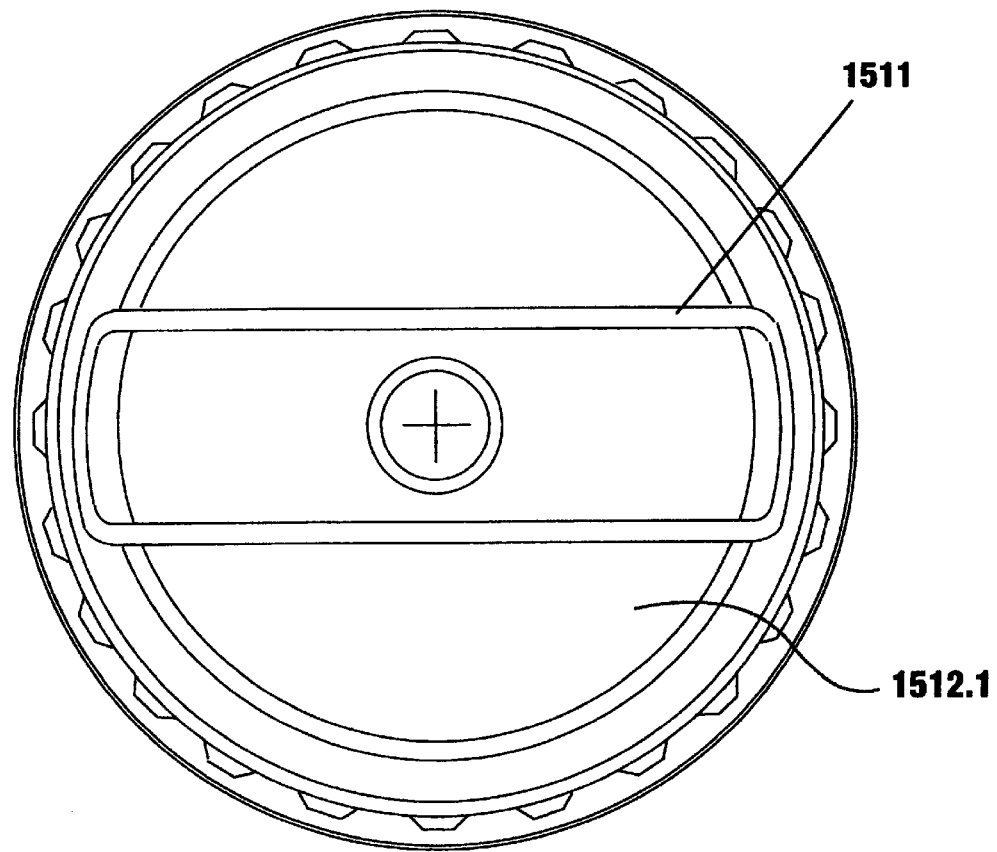
FIG. 42 is a top planar view of FIG. 41.

FIGS. 41 and 42 illustrate a sixteenth embodiment of the invention wherein a retaining mechanism in the form of an elastic or rubber retaining band is provided. The retaining band 1511 mounts around upwardly extending sidewall portions 1513 and stretches across a central discate portion 1512.1 of the lid to thereby retain a digital media disk 1516 against the central discate portion. The digital media disk is easily removed by merely removing the retaining band from rim portions 1513.

Figure 43:
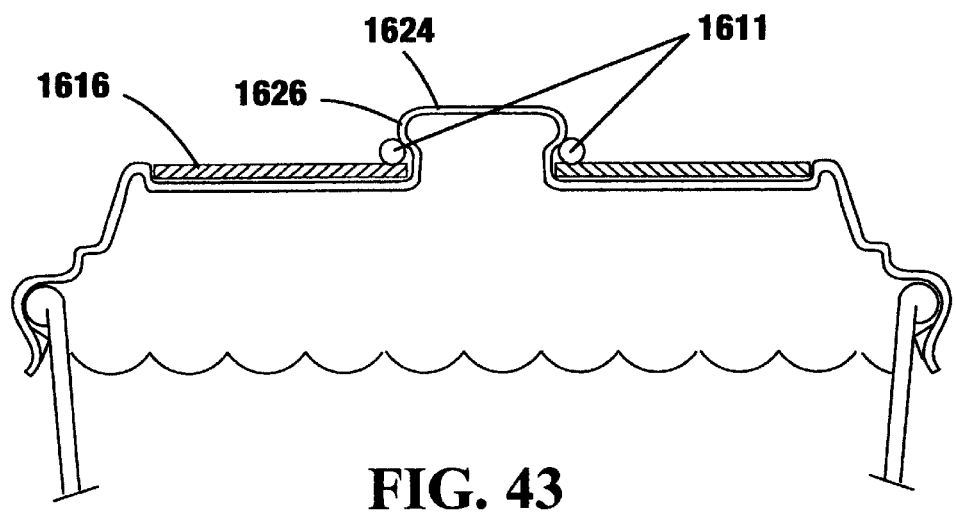
FIG. 43 illustrates a seventeenth embodiment of the invention also providing an elastic retaining band for retaining a digital media disk to a drink cup lid.
Figure 44:
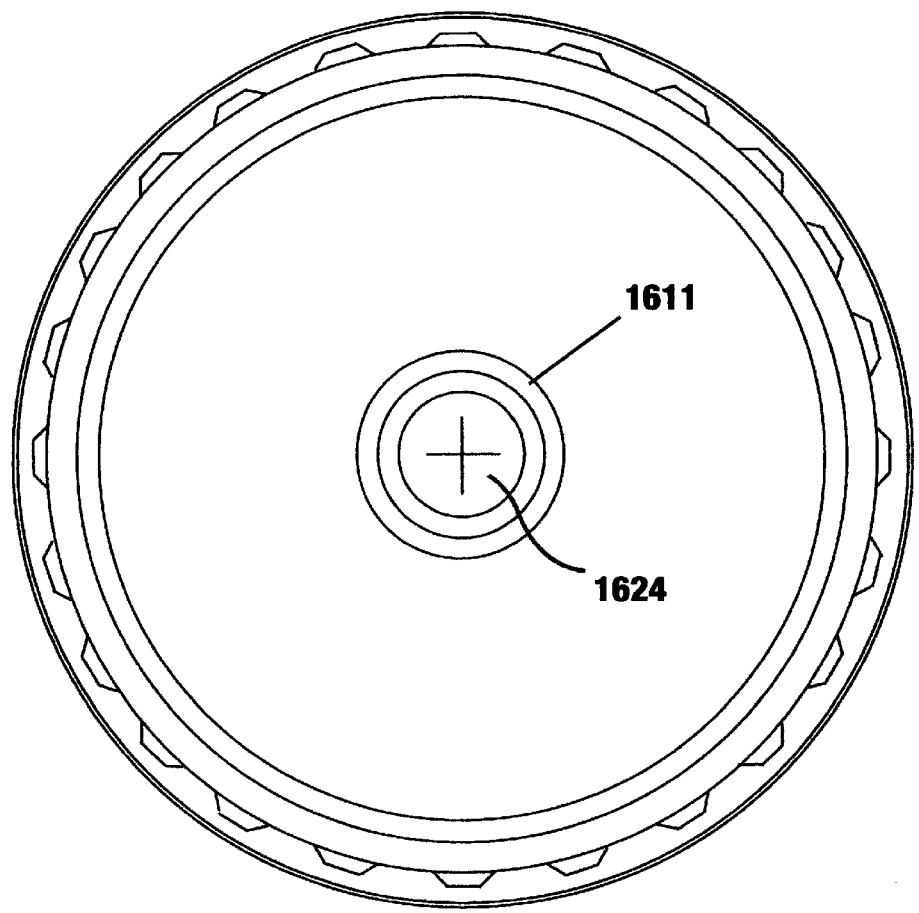
FIG. 44 is a top planar view of the lid of FIG. 43.

FIGS. 43 and 44 illustrate a seventeenth embodiment of the invention incorporating a retaining band similar to that of FIGS. 41 and 42 but wherein the retaining band is sized so as to fit snugly around a central pedestal 1624. The central pedestal includes a rim portion 1626 which helps hold the retaining band. More specifically, the retaining band is sized to fit snugly beneath rims 1626 of pedestal 1624 to help secure a digital media disk 1616 against a top discate surface of the container lid. The digital media disk is then easily removed merely by first removing the retaining band.

Figure 45:
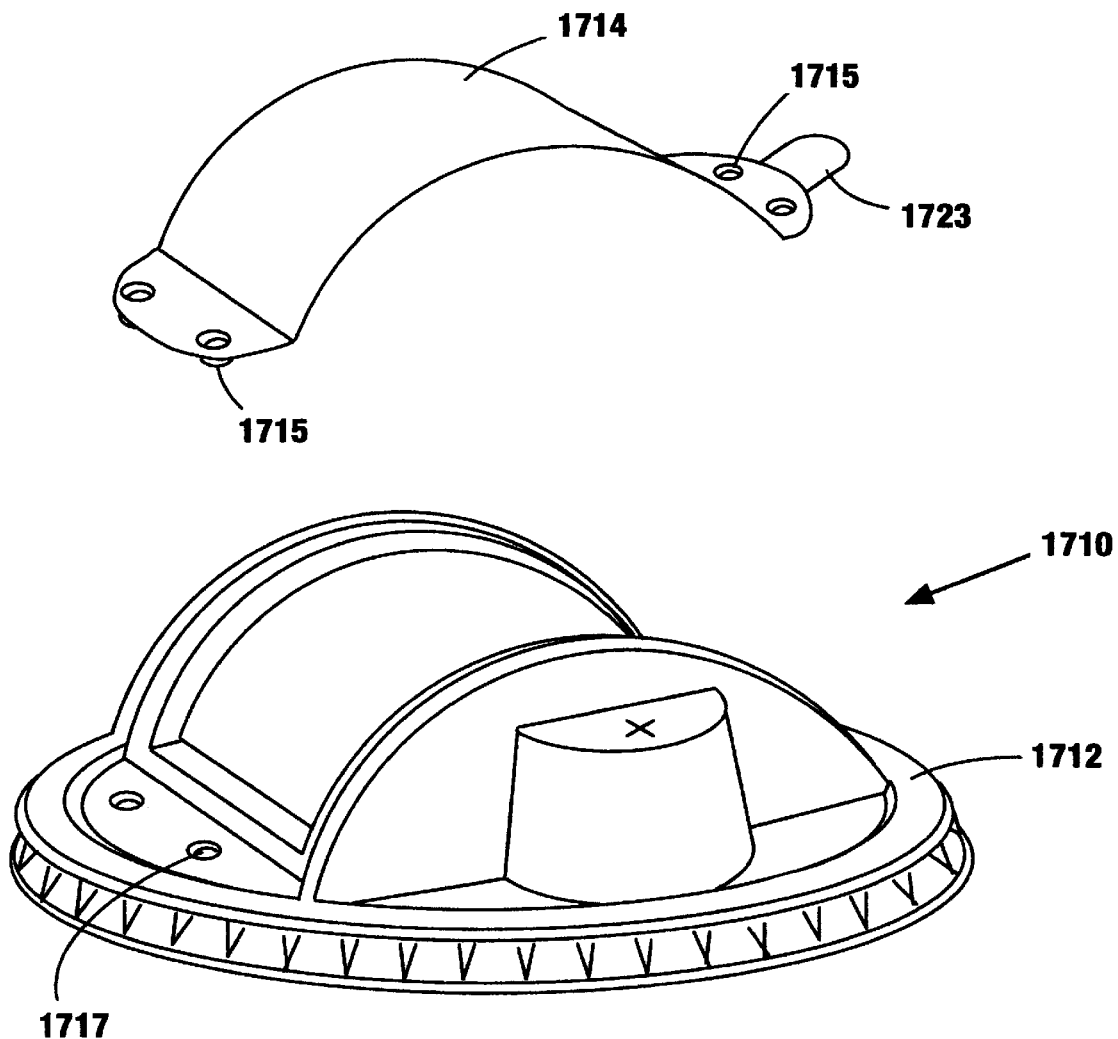
FIG. 45 is a perspective view of am eighteenth embodiment of the invention having a snap-on lens for mounting to a drink cup lid for forming a compartment therebetween for retaining a booklet.
Figure 46:
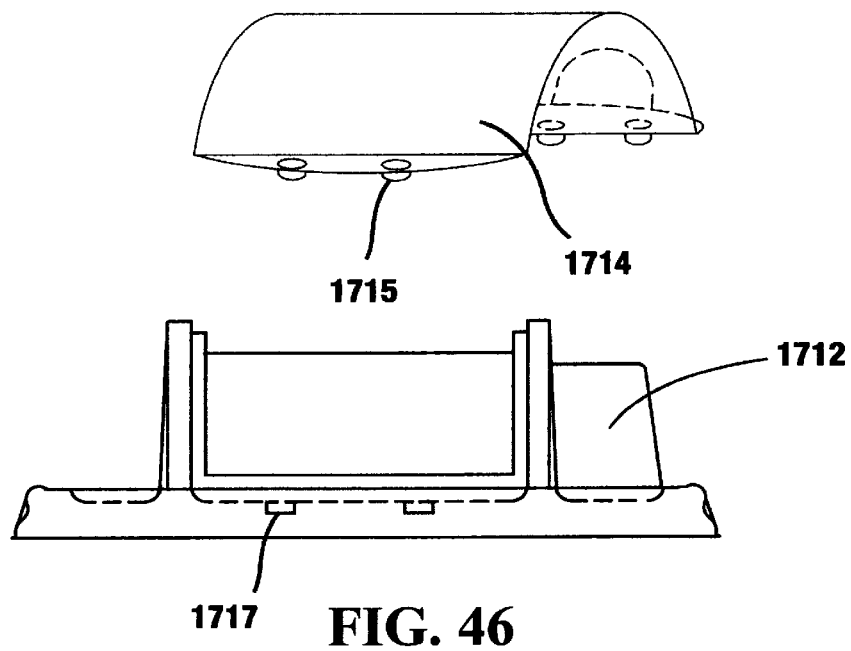
FIG. 46 is an exploded side elevational view of the lid of FIG. 45.
Figure 47:
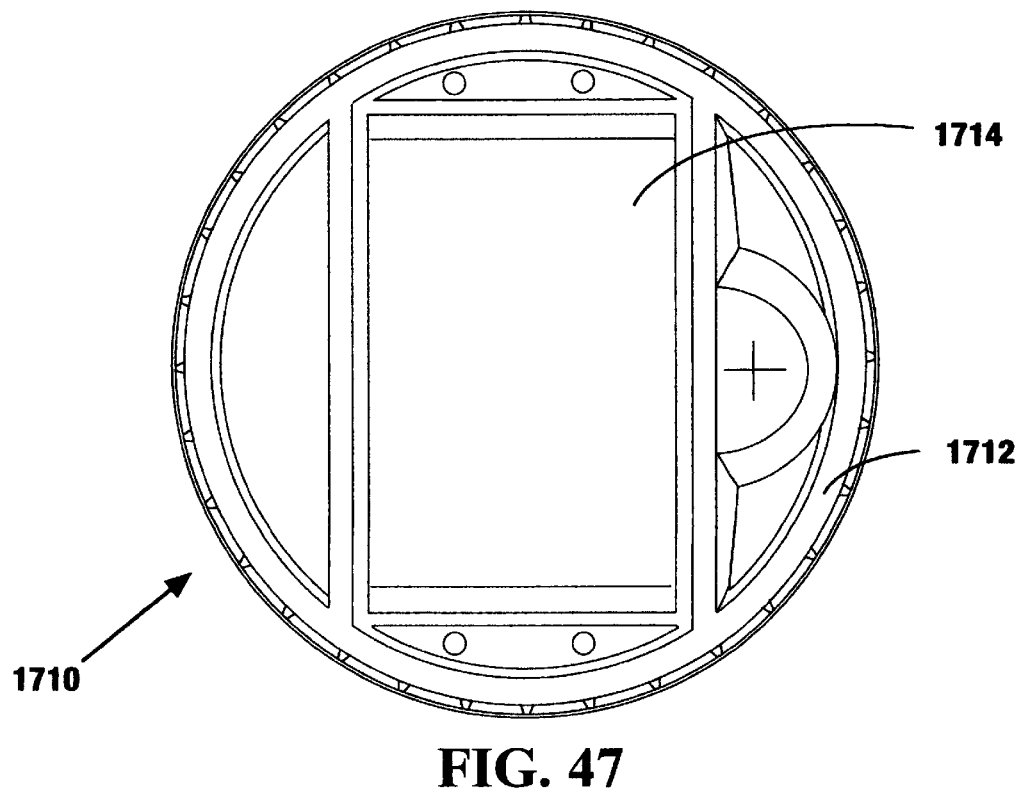
FIG. 47 is a top planar view of the lid of FIG. 45.
Figure 48:
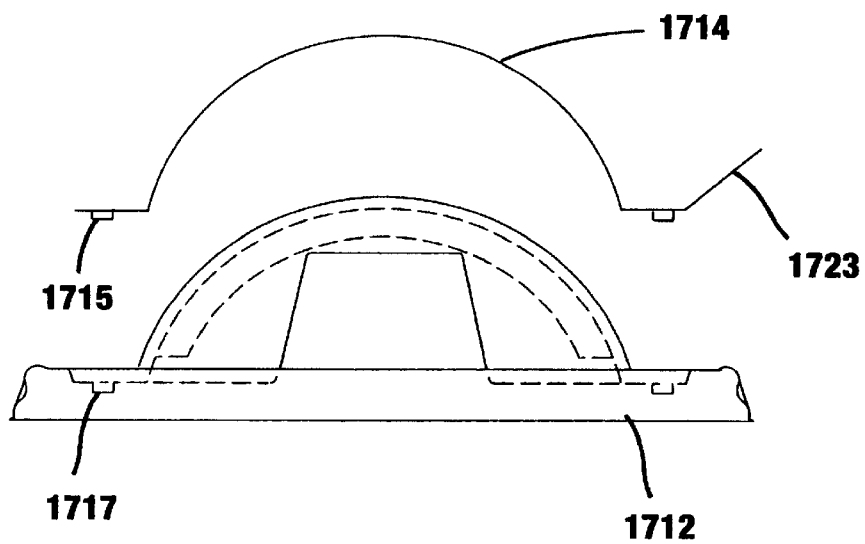
FIG. 48 is a front exploded elevational view of the lid of FIG. 45.
Figure 49:
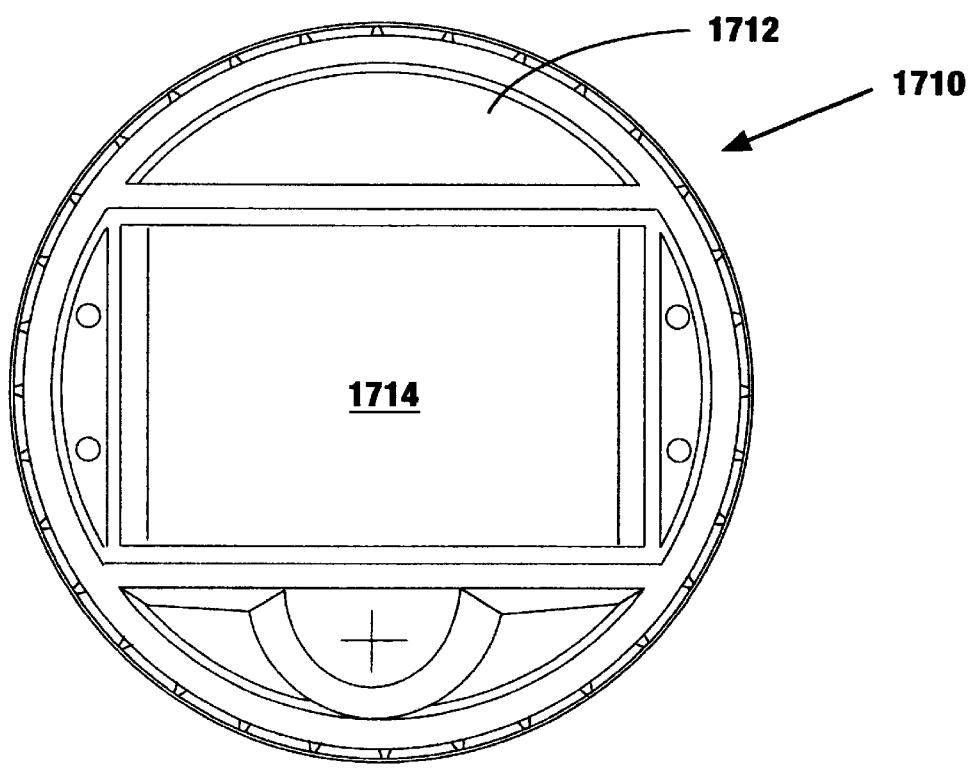
FIG. 49 is another top planar view of the lid of FIG. 45, rotated ninety degrees with respect to the view of FIG. 47.

FIGS. 45–49 illustrate an eighteenth embodiment of the invention wherein a compartment is formed for containing a booklet or the like. More specifically, FIG. 45 illustrates a container lid 1710 having an inner member 1712 and a curved container compartment closure member 1714 also referred to herein as a closure lens. The closure member is referred to herein as a "lens" because it is curved. However, the lens need not provide any optical effect such as magnification. Inner member 1712 and compartment closure member 1714 together form a curved compartment for retaining a booklet or the like. Container closure 1714 includes a set of snaps 1715 configured for resilient mounting within a set of detents 1717 formed within inner portion 1712. Closure member 1714 additionally includes a tab 1723 to facilitate removal of the compartment closure from the inner member to permit access to the compartment formed therebetween.

Thus, a drink container lid is provided which is similar to the embodiment of FIGS. 15–18 but wherein a snap-fit retaining mechanism is provided for mounting the compartment closure to the container lid. In the embodiment illustrated, the snaps 1715 of compartment closure 1714 are generally round for insertion into similarly shaped round detents 1717 of the inner member. However, a wide variety of other snap-fit retaining mechanisms may be provided. For example, the shapes of snaps 1715 of the compartment closure may have any other suitable shape, with the detents 1717 of the inner member formed to correspond therewith. More or fewer of the snap-on mechanisms may be provided. Adhesive attachment mechanisms may alternatively be employed. As can be appreciated, a wide range of retaining mechanisms may be provided for detachably retaining the compartment closure 1714 to the inner member 1712 to retain a booklet or the like within the compartment formed therebetween.

Figure 50:
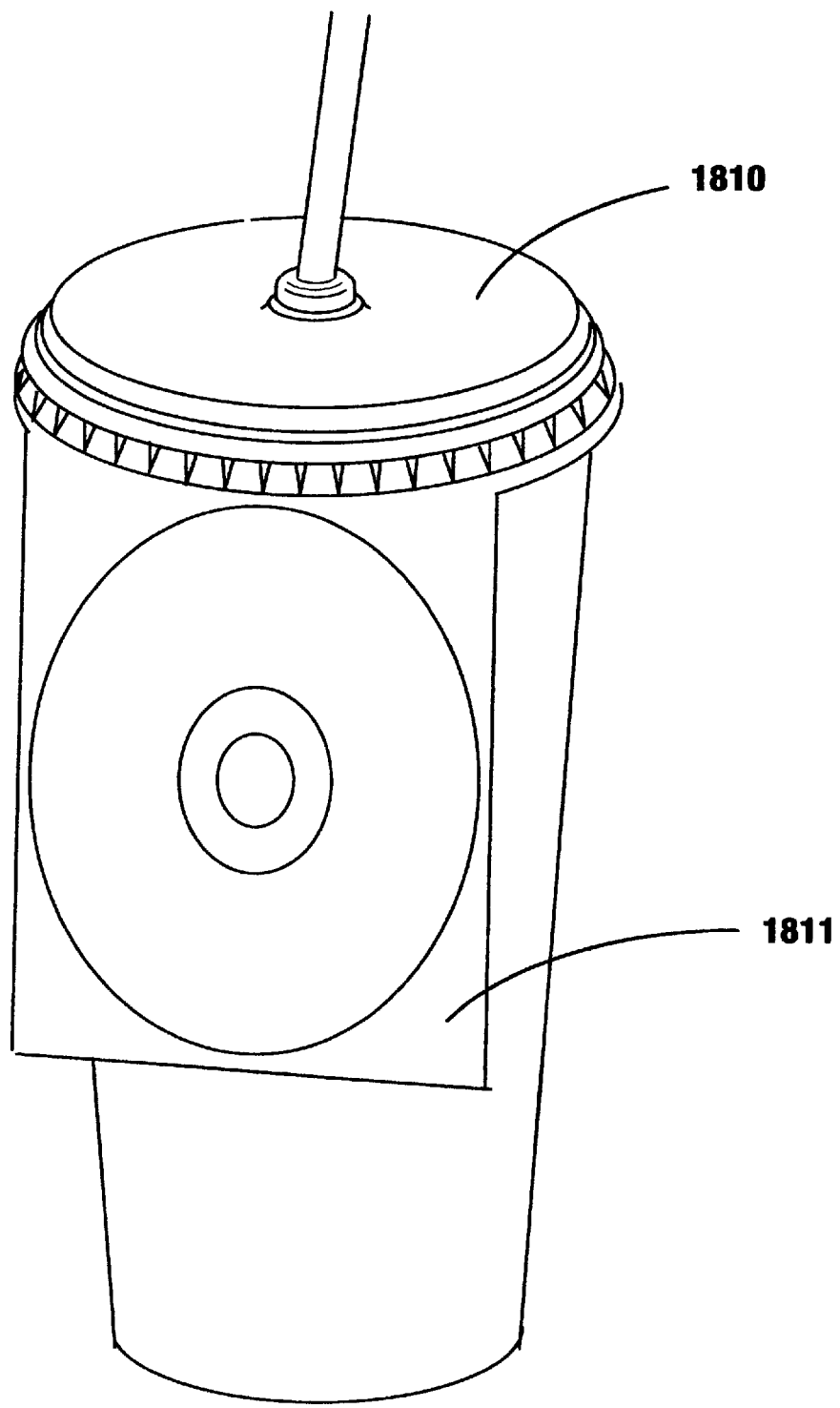
FIG. 50 is a perspective view of a nineteenth embodiment of the invention having a compartment for retaining a digital media disk depending from an outer periphery of a drink cup lid.

With reference to FIG. 50, a drink container lid 1810 configured in accordance with a nineteenth embodiment of the invention will now briefly be described. Lid 1810 includes a bag or other compartment 1811 depending from an outer perimeter of the lid along a side wall of the cup for holding a digital media disk, or other merchandise, in the bag. Bag 1811 may be formed of flexible plastic or other suitable material. Top edges of the bag are adhesively attached to outer perimeter portions of the lid. Other retaining mechanisms may be provided for affixing the retaining bag to the remaining portions of the lid. The digital media disk is removed from the bag either by tearing top edges of the bag away from remaining portions of the lid to thereby open the bag or in the alternative by merely tearing open side portions of the bag.

Although described primarily with respect to digital media disks, it is also to be understood that, for many of the embodiments described thus far, the closures of the invention may be formed in different configurations to hold and display many different items, such as game cards, game pieces, toys, coupons, stamps and stickers, scratch-off cards, and the like.

Figure 51:
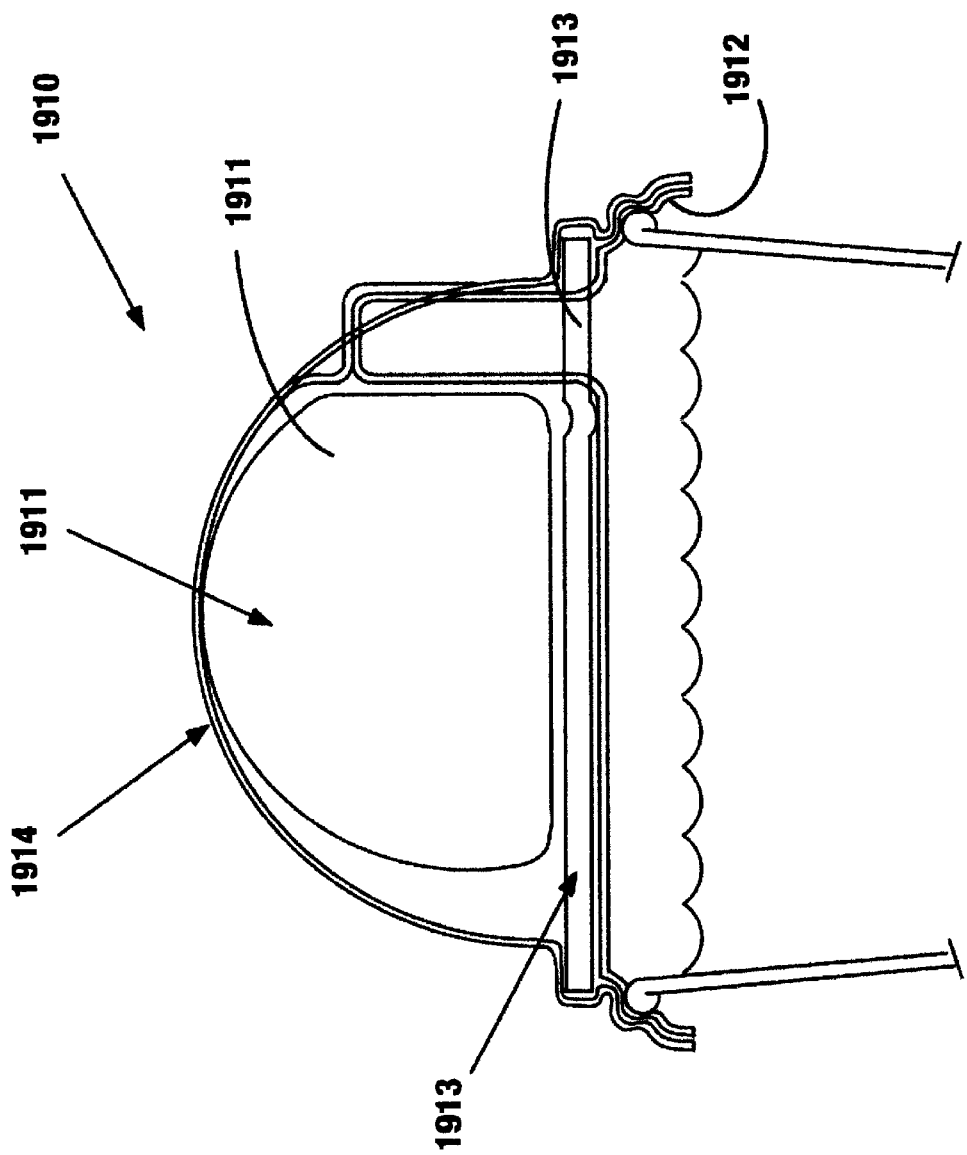
FIG. 51 is a side cross-sectional view illustrating a twentieth embodiment of the invention wherein a drink container lid includes a compartment for retaining a ball or other toy.
Figure 53:
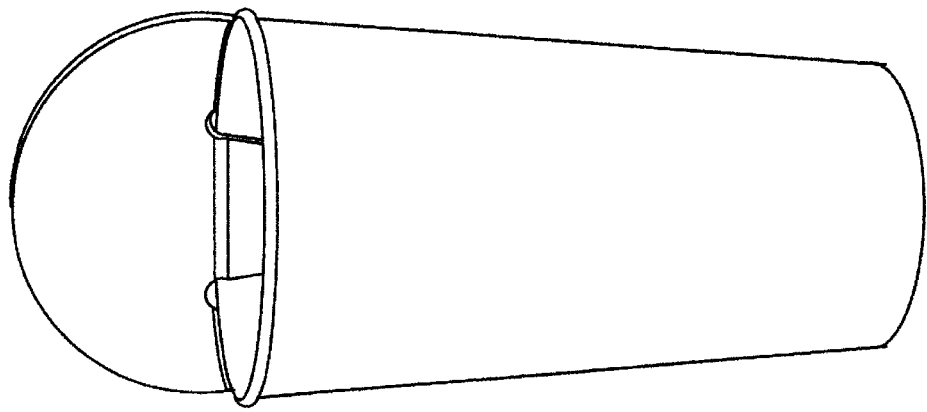
FIG. 53 is a perspective view of a backboard portion of the lid of FIG. 51 shown mounted to the rim of a drink cup.
Figure 52:
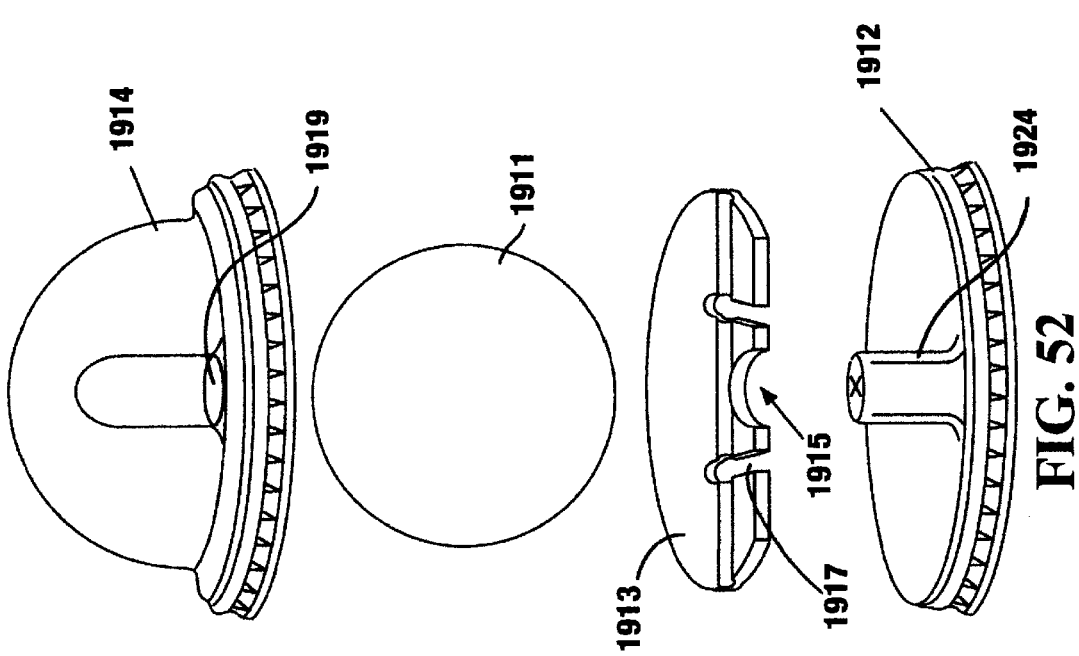
FIG. 52 is an exploded perspective view of the lid of FIG. 51.

FIGS. 51–53 illustrate a twentieth embodiment of the invention wherein a drink container closure 1910 is provided for retaining both a compressible ball 1911 and a removable backboard 1913. As seen most clearly in FIG. 52, the ball and the backboard are initially mounted within a compartment formed between an inner member 1912 and an outer member 1914 of the container lid. The backboard 1913 lies against a top flat portion of inner member 1912 and includes a semi-circular indent 1915 as well as a pair of slots 1917. Indent 1915 is provided such that, when the backboard is positioned on the top surface of the inner member, a pedestal 1924 of the inner member passes through the indent. Slots 1917 are provided such that, upon removal of the backboard from the compartment, the backboard may be mounted to the top rim of the drink cup providing a backboard similar to that of a basketball backboard, as shown most clearly in FIG. 53.

Outer member 1914 is generally dome-shaped or semi-spherical to accommodate a ball, or the like, between the inner member and the outer member. Preferably, a compressible ball, such as a foam ball, is provided. In the alternative, a somewhat smaller non-compressible ball may be employed. Indicia may be provided on the ball to simulate a basketball or the like.

In use, a customer receiving a drink cup having the lid of FIGS. 51–53 consumes any beverage contained therein, then removes the outer member from the inner member thereby gaining access to the ball and the backboard. The customer then mounts the backboard to the empty drink cup and thereafter can use the cup and backboard as a basketball-hoop-like assembly for use with the toy ball. As can be appreciated, a wide variety of other toys or other products may be mounted within the compartment. Also, other accessories, similar to that of the backboard, may additionally be mounted within the compartment for use with the toy or other product.

Finally with respect to FIGS. 51–53, pedestal 1924 is relatively high, thereby positioning crossed slits formed therein well above the level of beverage within the drink cup. With the slits positioned high above the level of the beverage, it is unlikely that any liquid within the cup will seep through the slits. Also inner peripheral portions of an opening 1919 of the outer member configured for mounting over the pedestal are sized so as to fit snugly against the pedestal to further prevent seepage of liquid into the inner compartment of the lid.

Figure 54:
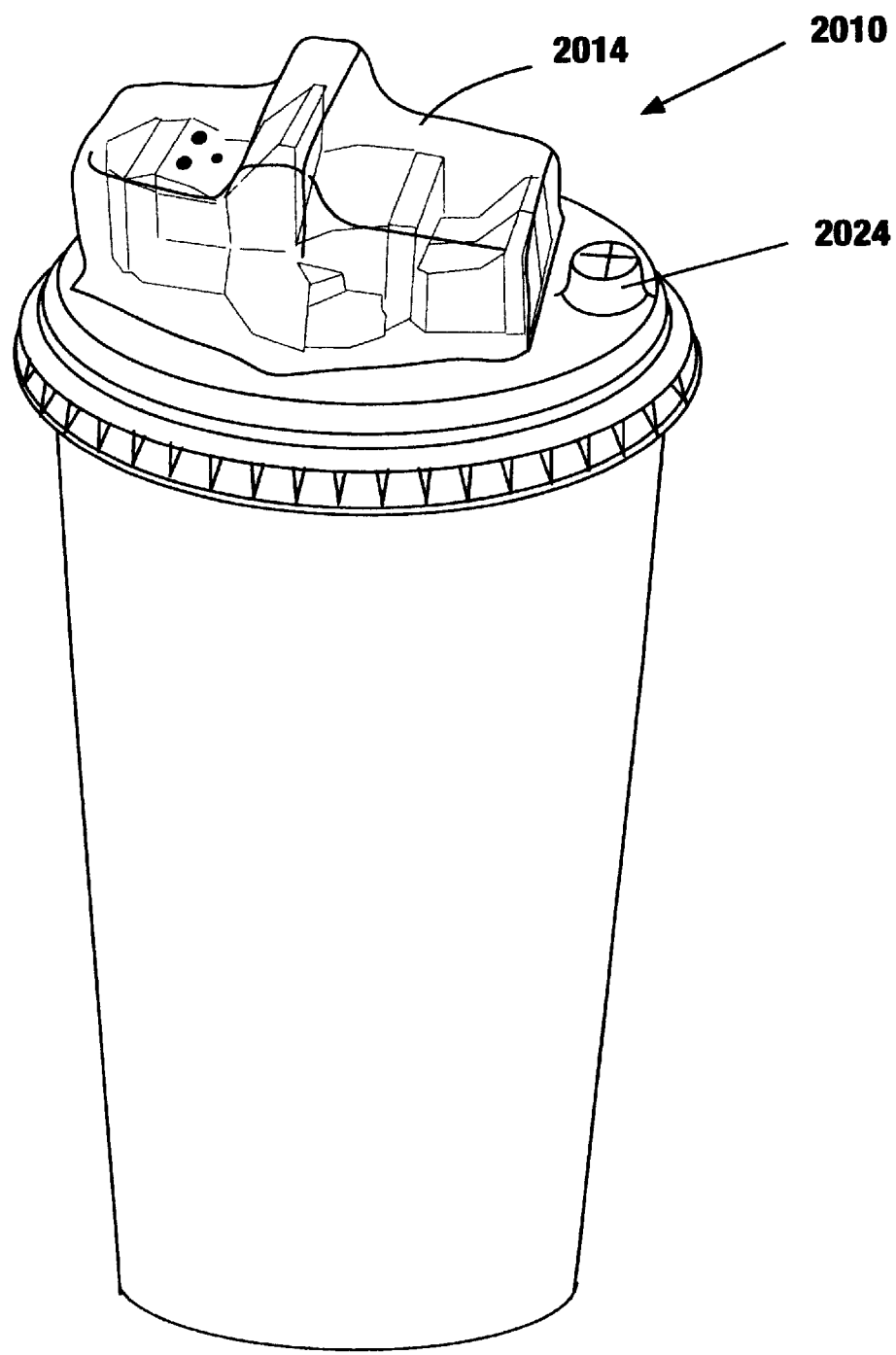
FIG. 54 is a perspective view of a twenty-first embodiment of the invention wherein a drink container lid is configured to retain a toy.
Figure 55:
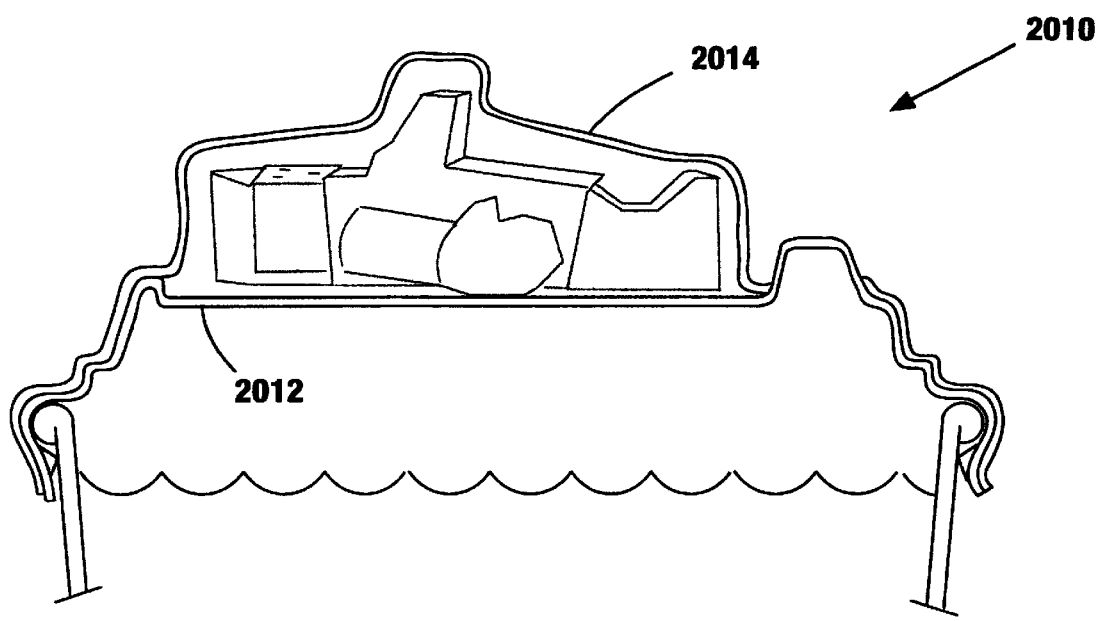
FIG. 55 is a side cross sectional view of the lid of FIG. 54.

FIGS. 54–55 illustrate a drink cup lid 2010 configured in accordance with a twenty-first embodiment of the invention wherein the lid is configured for enclosing a toy or the like. Briefly, lid 2010 includes inner and outer members configured to provide a compartment therein for retaining a three-dimensional toy. To this end, the outer member has a shape conforming with three-dimensional characteristics of the toy to thereby help secure the toy within the compartment and limit the ability of the toy to move within the compartment. In the embodiment illustrated in FIGS. 54 and 55, a small amount of space remains between the toy and the outer member. In other embodiments, a greater or lesser amount of space remains. Finally with respect to FIGS. 54 and 55, the inner member includes a pedestal 2024 having crossed slits formed thereon. The outer member includes an opening for mounting over the pedestal configured for frictionally fitting against outer side walls of the pedestal. In this manner, the crossed slits are positioned well above the level of any liquid within the cup thereby limiting the risk of seepage of liquid through the slits. Moreover, even if liquid seeps through the slits, the snug fit of the outer member to the sidewalls of the pedestal of the inner member helps prevent seepage of liquid into the container compartment.

It should be understood, as part of the invention, that in certain applications of the invention it may be found desirable to permanently join the inner and outer members, as by sonic welding or thermal welding, so that the closure must be "broken" in order to gain access to the premium or other item contained between the inner member and the outer member.

In accordance with another feature of the invention an enlarging lens or distorting lens may be incorporated into the outer closure member of some embodiments of the invention, whereby to magnify or distort printed matter or objects placed in a recess in the upper surface of the outer closure member. The lenses employed in this embodiment of the present invention may be common lenses or Fresnel lenses. Any recess in the upper surface of the outer member of the closure of this embodiment may be a shallow, flat-bottomed recess having a plurality of ears projecting from the wall of the recess, which ears are so constructed and arranged that the art work or other objects to be mounted therein can be pushed downwardly into the recess, and will "automatically" become trapped under the tabs.

What have been described are various exemplary embodiments of closures for use with merchandise containers, particularly drink cups. It should be a understood, however, that the examples described herein merely illustrate aspects of the invention and should not be construed as limiting the scope of the invention which may be implemented in any manner consistent with the general principles of the invention described therein.

What is claimed is:

1. A closure for a drink container, the closure comprising:
   an inner member having an opening formed therein for receiving a straw and having a peripheral portion for snap-on mounting to the drink container;
   an outer member configured to be fitted to the inner member forming a compartment therebetween, the outer member also having an opening, with the opening of the outer member aligned with the opening of the inner member while the outer member is fitted to the inner member, with the aligned openings permitting penetration of a straw therethrough;
   a hinge pivotally connecting the inner and outer members along peripheral portions thereof; and
   a digital media disk enclosed within the compartment.

2. The closure of claim 1 wherein a bottom surface of the outer member and a top surface of the inner member include circular flat portions and wherein the flat bottom surface of the outer member lies closely adjacent to the flat top surface of the inner member while the outer member is fitted to the inner member forming a thin compartment closely receiving the digital media disk.

3. The closure of claim 1 wherein a bottom surface of the outer member includes a curved portion and a top surface of the inner member includes a flat portion and wherein the curved bottom surface of the outer member is offset from the flat top surface of the inner member while the outer member is fitted to the inner member.

4. The closure of claim 1 wherein the outermember substantially covers all of the inner member while the outer member is fitted to the inner member.

5. The closure of claim 1 wherein the inner member is circular and wherein the outer member covers a narrow, radial portion of the circular inner member while the outer member is fitted to the inner member.

6. The closure of claim 1 wherein the inner and outer members form a closed compartment.

7. The closure of claim 6 wherein the closed compartment is shaped to closely receive the digital media disk, with the openings of the inner and outer members aligned with a center of the compartment to permit a straw penetrating the openings to pass through a center hole within the digital media disk.

8. The closure of claim 1 wherein the inner member is circular and wherein the outer member covers a substantially semicircular portion of the circular inner member while the outer member is fitted to the inner member.

9. The closure of claim 8 wherein the inner member and the outer members include skirt portions extending downwardly from outer peripheral portions thereof, the skirt portions extending downwardly along sides of the drink container while the closure is mounted to the drink container, the skirt portions together forming a second compartment for receiving display material, the hinge connecting bottom ends of the skirt portions together.

10. The closure of claim 1 the outer member includes a pull-tab extending from a perimeter thereof.

11. The closure of claim 10 wherein the inner member includes a pull-tab extending from a perimeter thereof, the pull-tab of the inner member being aligned with the pull-tab of the outer member.

12. The closure of claim 1 wherein the inner and outer members form an open-sided compartment.

13. The closure of claim 12 wherein the inner member has a top circular discate surface supporting the digital media disk.

14. The closure of claim 13 wherein at least a portion of the digital media disk is within the open-sided compartment.

15. A closure for a drink container, the closure comprising:
   an inner member having an opening formed therein for receiving a straw and having a peripheral portion for snap-on mounting to the drink container;
   an outer member configured to be fitted to the inner member forming a compartment therebetween, the outer member also having an opening, with the opening of the outer member aligned with the opening of the inner member while the outer member is fitted to the inner member, with the aligned openings permitting penetration of a straw therethrough;
   a hinge pivotally connecting the inner and outer members along peripheral portions thereof; and
   wherein the inner and outer members form an open-sided compartment.

16. The closure of claim 15 further including a digital media disk partially enclosed within the open-sided compartment.

17. The closure of claim 16 wherein the inner member has a top circular discate surface supporting the digital media disk.

18. A closure for a drink container, the closure comprising:
   an inner member having an opening formed therein for receiving a straw and having a peripheral portion for snap-on mounting to the drink container;
   an outer member configured to be fitted to the inner member forming a compartment therebetween, the outer member also having an opening, with the opening of the outer member aligned with the opening of the inner member while the outer member is fitted to the inner member, with the aligned openings permitting penetration of a straw therethrough;
   a hinge pivotally connecting the inner and outer members along peripheral portions thereof; and
   wherein the inner member is circular and wherein the outer member covers a substantially semicircular portion of the circular inner member while the outer member is fitted to the inner member.

19. The closure of claim 18 wherein the inner member and the outer members include skirt portions extending downwardly from outer peripheral portions thereof, the skirt portions extending downwardly along sides of the drink container while the closure is mounted to the drink container, the skirt portions together forming a second compartment for receiving display material, the hinge connecting bottom ends of the skirt portions together.

20. The closure of claim 18 further including a digital media disk partially enclosed within the compartment.

21. A closure for a drink container, the closure comprising:

an inner member having an opening formed therein for receiving a straw and having a peripheral portion for snap-on mounting to the drink container;

an outer member configured to be fitted to the inner member forming a compartment therebetween, the outer member also having an opening, with the opening of the outer member aligned with the opening of the inner member while the outer member is fitted to the inner member, with the aligned openings permitting penetration of a straw therethrough;

a hinge pivotally connecting the inner and outer members along peripheral portions thereof; and wherein the inner member is circular and wherein the outer member covers a narrow, radial portion of the circular inner member while the outer member is fitted to the inner member.

22. The closure of claim 21 further including a digital media disk partially enclosed within the compartment.

23. A closure for a drink container, the closure comprising:

an inner member having an opening formed therein for receiving a straw and having a peripheral portion for snap-on mounting to the drink container;

an outer member configured to be fitted to the inner member forming a compartment therebetween, the outer member also having an opening, with the opening of the outer member aligned with the opening of the inner member while the outer member is fitted to the inner member, with the aligned openings permitting penetration of a straw therethrough;

a hinge pivotally connecting the inner and outer members along peripheral portions thereof; and wherein the outer member includes a pull-tab extending from a perimeter thereof and wherein the inner member includes a pull-tab extending from a perimeter thereof, the pull-tab of the inner member being aligned with the pull-tab of the outer member.

24. The closure of claim 23 further including a digital media disk enclosed within the compartment.

* * * * *